(12) United States Patent
Sugimoto et al.

(10) Patent No.: US 10,820,000 B2
(45) Date of Patent: *Oct. 27, 2020

(54) IMAGE CODING DEVICE, IMAGE DECODING DEVICE, IMAGE CODING METHOD, AND IMAGE DECODING METHOD

(71) Applicant: MITSUBISHI ELECTRIC CORPORATION, Tokyo (JP)

(72) Inventors: Kazuo Sugimoto, Tokyo (JP); Shunichi Sekiguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/545,740

(22) Filed: Aug. 20, 2019

(65) Prior Publication Data

US 2019/0394479 A1 Dec. 26, 2019

Related U.S. Application Data

(62) Division of application No. 13/991,041, filed as application No. PCT/JP2011/006116 on Nov. 1, 2011, now Pat. No. 10,432,956.

(30) Foreign Application Priority Data

Dec. 17, 2010 (JP) .................................. 2010-281743

(51) Int. Cl.
*H04N 19/46* (2014.01)
*H04N 19/96* (2014.01)
(Continued)

(52) U.S. Cl.
CPC ........... *H04N 19/46* (2014.11); *H04N 19/119* (2014.11); *H04N 19/105* (2014.11); *H04N 19/593* (2014.11); *H04N 19/96* (2014.11)

(58) Field of Classification Search
CPC .... H04N 19/105; H04N 19/593; H04N 19/96; H04N 19/119; H04N 19/46; H04N 19/159; H04N 19/50; G06T 9/00
See application file for complete search history.

(56) References Cited

U.S. PATENT DOCUMENTS

2002/0001411 A1  1/2002  Suzuki et al.
2006/0146941 A1  7/2006  Cha et al.
(Continued)

FOREIGN PATENT DOCUMENTS

CN     101682770 A    3/2010
JP     2008-104228 A  5/2008
(Continued)

OTHER PUBLICATIONS

ITU-T, Telecommunication Standardization Sector of ITU, H.264, (Mar. 2010), "Advanced video coding for generic audiovisual services", Series H: Audiovisual and Multimedia Systems, Infrastructure of audiovisual Services—Coding of moving video, International Telecommunication Union, pp. 1-366, Mar. 2010.

(Continued)

*Primary Examiner* — Anner N Holder
(74) *Attorney, Agent, or Firm* — Birch, Stewart, Kolasch & Birch, LLP

(57) ABSTRACT

When a coding mode selected by an encoding controlling part 1 is an intra prediction mode, an intra prediction part 4 carries out an intra-frame prediction process using pixels adjacent to a partition $P_i^n$ which is generated through a division by a block dividing part 2 or pixels adjacent to a higher layer partition $P_i^{n-1}$ to which the partition $P_i^n$ belongs to generate a prediction image ($P_i^n$).

5 Claims, 14 Drawing Sheets

(51) Int. Cl.
*H04N 19/105* (2014.01)
*H04N 19/119* (2014.01)
*H04N 19/593* (2014.01)

(56) References Cited

U.S. PATENT DOCUMENTS

| | | |
|---|---|---|
| 2007/0110328 A1 | 5/2007 | Okada et al. |
| 2008/0165849 A1 | 7/2008 | Moriya et al. |
| 2008/0310504 A1 | 12/2008 | Ye et al. |
| 2008/0310507 A1 | 12/2008 | Ye et al. |
| 2009/0003441 A1 | 1/2009 | Sekiguchi et al. |
| 2010/0166073 A1* | 7/2010 | Schmit ............ H04N 19/51 375/240.16 |
| 2010/0208802 A1 | 8/2010 | Tsukuba et al. |
| 2010/0208827 A1* | 8/2010 | Divorra Escoda ..... H04N 19/61 375/240.24 |
| 2011/0103475 A1 | 5/2011 | Alshina et al. |
| 2011/0170793 A1 | 7/2011 | Sato et al. |
| 2011/0188769 A1 | 8/2011 | Fuchie et al. |
| 2011/0243230 A1 | 10/2011 | Liu |
| 2012/0033731 A1 | 2/2012 | Yamamoto et al. |
| 2012/0033736 A1 | 2/2012 | Sato |

FOREIGN PATENT DOCUMENTS

| | | |
|---|---|---|
| JP | 2010-116869 A | 5/2010 |
| JP | 2010-530184 A | 9/2010 |
| JP | 5984984 B2 | 8/2016 |
| RU | 2189120 C2 | 9/2002 |
| RU | 2341036 C2 | 12/2008 |
| WO | WO 2009/157577 A1 | 12/2009 |
| WO | WO 2010/035732 A1 | 4/2010 |
| WO | WO 2010/116869 A1 | 10/2010 |
| WO | WO 2010/123056 A1 | 10/2010 |

OTHER PUBLICATIONS

JCT-VC, "Test Model under Consideration (draft007)", Motion Picture Expert Group, ISO/IEC JTC1/SC29/WG11 w11280, Apr. 19-23, 2010, XP030017777, pp. 1-152.

JCT-VC, "Test Model under Consideration," Joint Collaborative Team on Video Coding (JCT-VC) of ITU-T SG16 WP3 and ISO/IEC JTC1/SC29/WG11, Jul. 21-28, 2010, pp. 1-152, Document: JCTVC-B205.

Winken et al., "Video Coding Technology Proposal by Fraunhofer HHI", JCTVC-A116, Apr. 15-Apr. 23, 2010, XP030007558, 28 pages.

* cited by examiner

FIG.5
| Intra Prediction Mode Index | Intra Prediction Mode |
|---|---|
| 0 | Vertical Prediction |
| 1 | Horizontal Prediction |
| 2 | Average Prediction |
| 3~N-1 | Diagonal Prediction |
N: Number Of Intra Prediction Modes
Directional Predictions in Case of N=9 (8 Modes)
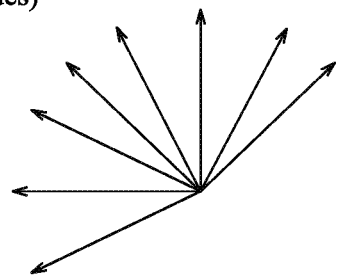
Directional Predictions in Case of N=17 (16 Modes)
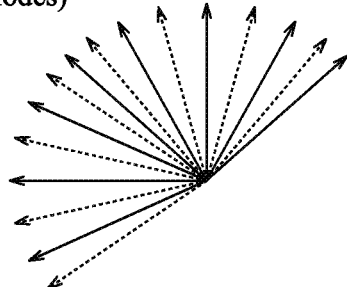
Directional Prediction in Case of N=33 (32 Modes)
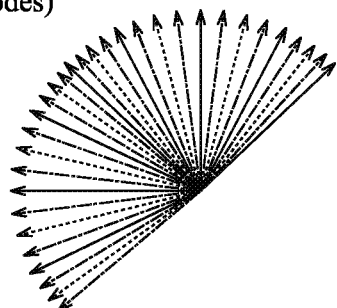

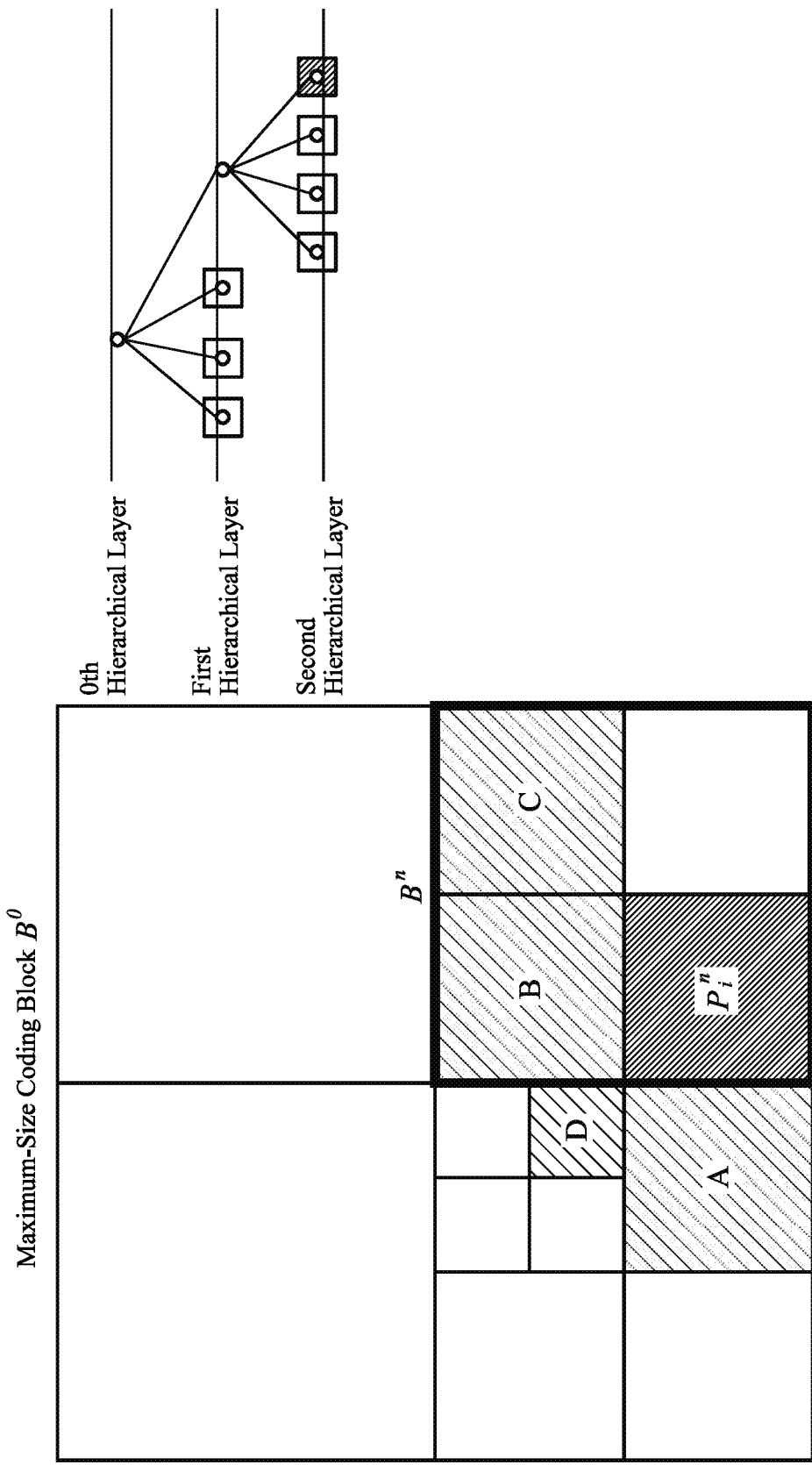

FIG.9

In Case Of 17

| Intra Prediction Mode Index | Intra Prediction Mode | Intra Prediction Mode Index | Intra Prediction Mode |
|---|---|---|---|
| 0 | Vertical Prediction | 9 | Vertical Prediction In Higher Layer |
| 1 | Horizontal Prediction | 10 | Horizontal Prediction In Higher Layer |
| 2 | Average Prediction | 11 | Average Prediction In Higher Layer |
| 3 | Diagonal Prediction 1 | 12 | Diagonal Prediction 1 In Higher Layer |
| 4 | Diagonal Prediction 2 | 13 | Diagonal Prediction 2 In Higher Layer |
| 5 | Diagonal Prediction 3 | 14 | Diagonal Prediction 3 In Higher Layer |
| 6 | Diagonal Prediction 4 | 15 | Diagonal Prediction 4 In Higher Layer |
| 7 | Diagonal Prediction 5 | 16 | Diagonal Prediction 5 In Higher Layer |
| 8 | Diagonal Prediction 6 | 17 | Diagonal Prediction 6 In Higher Layer |

FIG.13
(A)
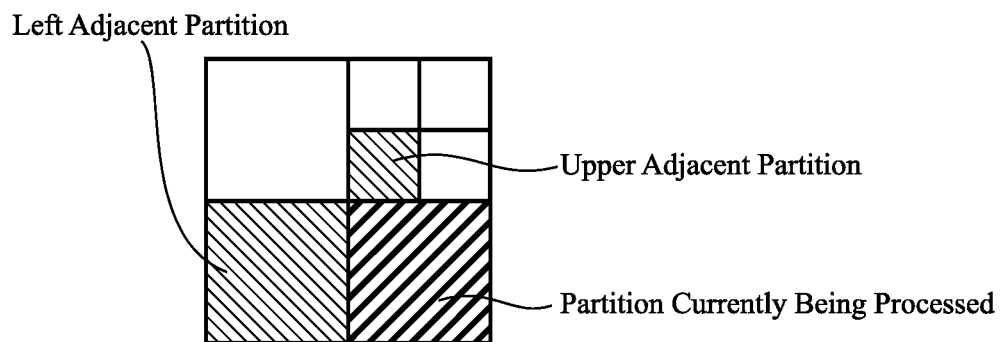
(B)
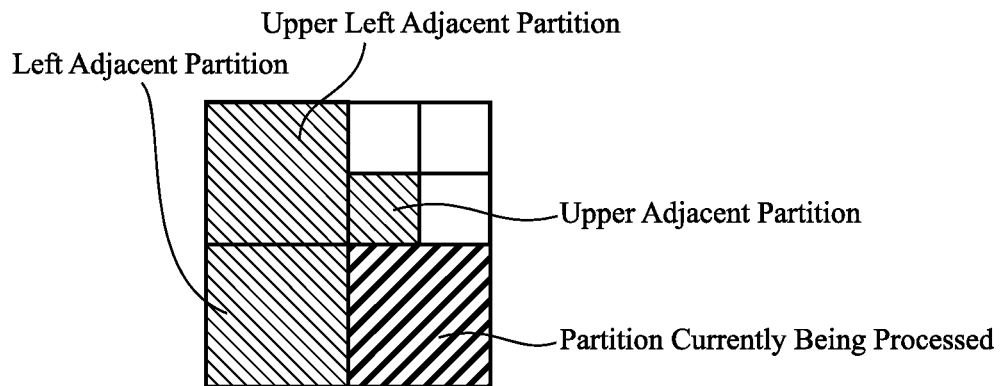

IMAGE CODING DEVICE, IMAGE DECODING DEVICE, IMAGE CODING METHOD, AND IMAGE DECODING METHOD

CROSS-REFERENCE TO RELATED APPLICATIONS

This application is a Divisional of copending application Ser. No. 13/991,041, filed on Jul. 2, 2013, which is the National Phase under 35 U.S.C. § 371 of International Application No. PCT/JP2011/006116, filed on Nov. 1, 2011, which claims the benefit under 35 U.S.C. § 119(a) to Patent Application No. 2010-281743, filed in Japan on Dec. 17, 2010, all of which are hereby expressly incorporated by reference into the present application.

FIELD OF THE INVENTION

The present invention relates to an image coding device for and an image coding method of encoding a moving image with a high degree of efficiency, and an image decoding device for and an image decoding method of decoding an encoded moving image with a high degree of efficiency.

BACKBROUND OF THE INVENTION

For example, in an intra prediction mode for luminance in an AVC/H.264 (ISO/IEC 14496-10|ITU-T H.264) encoding method which is an international standard method, one prediction mode can be selected from among a plurality of prediction modes for each block (for example, refer to nonpatent reference 1). FIG. 14 is an explanatory drawing showing intra prediction modes in the case of a 4×4 pixel block size for luminance. In the case of a 4×4 pixel block size for luminance, nine intra prediction modes (a mode 0, a mode 1, . . . , and a mode 8) are defined.

In the example shown in FIG. 14, each white circle shows a pixel in a block to be encoded. Each black circle shows a pixel that is used for prediction, and that exists in an already-encoded adjacent block. The mode 2 is the one in which an average prediction is carried out in such a way that each pixel in the block to be encoded is predicted by using the average of adjacent pixels existing in the upper and left blocks. Each of the modes other than the mode 2 is the one in which a directional prediction is carried out. Particularly, the mode 0 is the one in which a vertical prediction is carried out in such a way that adjacent pixels in the upper block are repeatedly replicated to create plural rows of pixels along a vertical direction to generate a prediction image. For example, the mode 0 is selected when the block to be encoded is a vertically striped pattern. The mode 1 is the one in which a horizontal prediction is carried out in such a way that adjacent pixels in the left block are repeatedly replicated to create plural columns of pixels along a horizontal direction to generate a prediction image. Further, in each of the modes 3 to 8, interpolation pixels running in a predetermined direction (i.e., a direction shown by arrows) are generated by using the adjacent pixels in the upper block or the left block to generate a prediction image.

The block size for luminance to which an intra prediction is applied can be selected from 4×4 pixels, 8×8 pixels, and 16×16 pixels. In the case in which the block size for luminance is 8×8 pixels, nine intra prediction modes are defined, like in the case in which the block size for luminance is 4×4 pixels. In contrast with this, in the case in which the block size for luminance is 16×16 pixels, four intra prediction modes which are called plane predictions are defined in addition to an average prediction mode, a vertical prediction mode, and a horizontal prediction mode. A plane prediction mode is a mode in which pixels created by carrying out an interpolation in a diagonal direction on the adjacent pixels in the upper block and the adjacent pixels in the left block are provided as predicted values.

Although in a directional prediction mode in the case in which the block size for luminance is 4×4 pixels or 8×8 pixels, because predicted values are generated along a direction predetermined according to the mode (e.g., a direction of 45 degrees), the prediction efficiency increases and the code amount can be reduced when the direction of a boundary (edge) of an object in the block matches the direction shown by the prediction mode, the prediction efficiency decreases when the direction of an edge of an object in the block does not match the direction shown by the prediction mode. In contrast with this, because an increase in the number of selectable directional prediction modes causes an increase in the probability that the direction of an edge matches the direction shown by a prediction mode, it can be assumed that the prediction efficiency increases.

RELATED ART DOCUMENT

Nonpatent Reference

Nonpatent reference 1: MPEG-4 AVC (ISO/IEC 14496-10)/H.ITU-T 264 standards

SUMMARY OF THE INVENTION

Problems to be Solved by the Invention

Because the conventional image coding device is constructed as above, an increase in the number of selectable directional prediction modes increases the probability that the direction of an edge matches the direction shown by a prediction mode, and hence the prediction efficiency can be improved. A problem is, however, that because the number of choices of similar prediction images increases even if the number of selectable directional predictions is increased, an improvement in the encoding efficiency commensurate with an increase in the amount of computation which is caused by the increase in the number of selectable directional predictions is not provided, and the increase in the number of selectable directional prediction has a limited contribution to improving the encoding efficiency.

The present invention is made in order to solve the above-mentioned problem, and it is therefore an object of the present invention to provide an image coding device and an image coding method capable of increasing the degree of improvement in the encoding efficiency which is caused by an increase in the number of directional prediction modes with a small amount of computation and a small code amount. It is another object of the present invention to provide an image decoding device and an image decoding method capable of correctly decoding coded data in which an improvement in the encoding efficiency is provided to acquire a moving image.

Means for Solving the Problem

In accordance with the present invention, there is provided an image coding device in which when a coding mode selected by an encoding controlling unit is an intra prediction mode, a prediction image generating unit carries out an intra-frame prediction process using pixels adjacent to each coding block which is generated through a division by a block dividing unit or pixels adjacent to a higher layer coding block to which each coding block belongs to generate a prediction image. Further, when the coding mode selected by the encoding controlling unit is an intra prediction mode, a variable length encoding unit encodes a flag indicating whether an intra prediction direction of a coding block adjacent to the coding block which is a target to be processed and which is generated through the division by the block dividing unit matches that of the target coding block, and, when the flag indicates that the intra prediction direction of an adjacent coding block matches that of the coding block, also encodes information showing whether which one of adjacent coding blocks has an intra prediction direction matching that of the coding block.

Advantages of the Invention

Because the image coding device in accordance with the present invention is constructed in such a way that when the coding mode selected by the encoding controlling unit is an intra prediction mode, the prediction image generating unit carries out an intra-frame prediction process using pixels adjacent to each coding block which is generated through the division by the block dividing unit or pixels adjacent to a higher layer coding block to which each coding block belongs to generate a prediction image, there is provided an advantage of being able to increase the degree of improvement in the encoding efficiency which is caused by an increase in the number of directional predictions with a small amount of computation and a small code amount.

BRIEF DESCRIPTION OF THE FIGURES

FIG. 5 is an explanatory drawing showing an example of an intra prediction parameter (intra prediction mode) which can be selected for each partition $P_i^n$ belonging to a coding block $B^n$;

FIG. 8 is an explanatory drawing showing a partition $P_i^n$ belonging to a coding block $B^n$;

FIG. 9 is an explanatory drawing showing an example of an intra prediction parameter (intra prediction mode) which can be selected for each partition $P_i^n$ belonging to a coding block $B^n$;

FIG. 13 is an explanatory drawing showing an adjacent partition; and

EMBODIMENTS OF THE INVENTION

Hereafter, in order to explain this invention in greater detail, the preferred embodiments of the present invention will be described with reference to the accompanying drawings. Embodiment 1.

Figure 1:
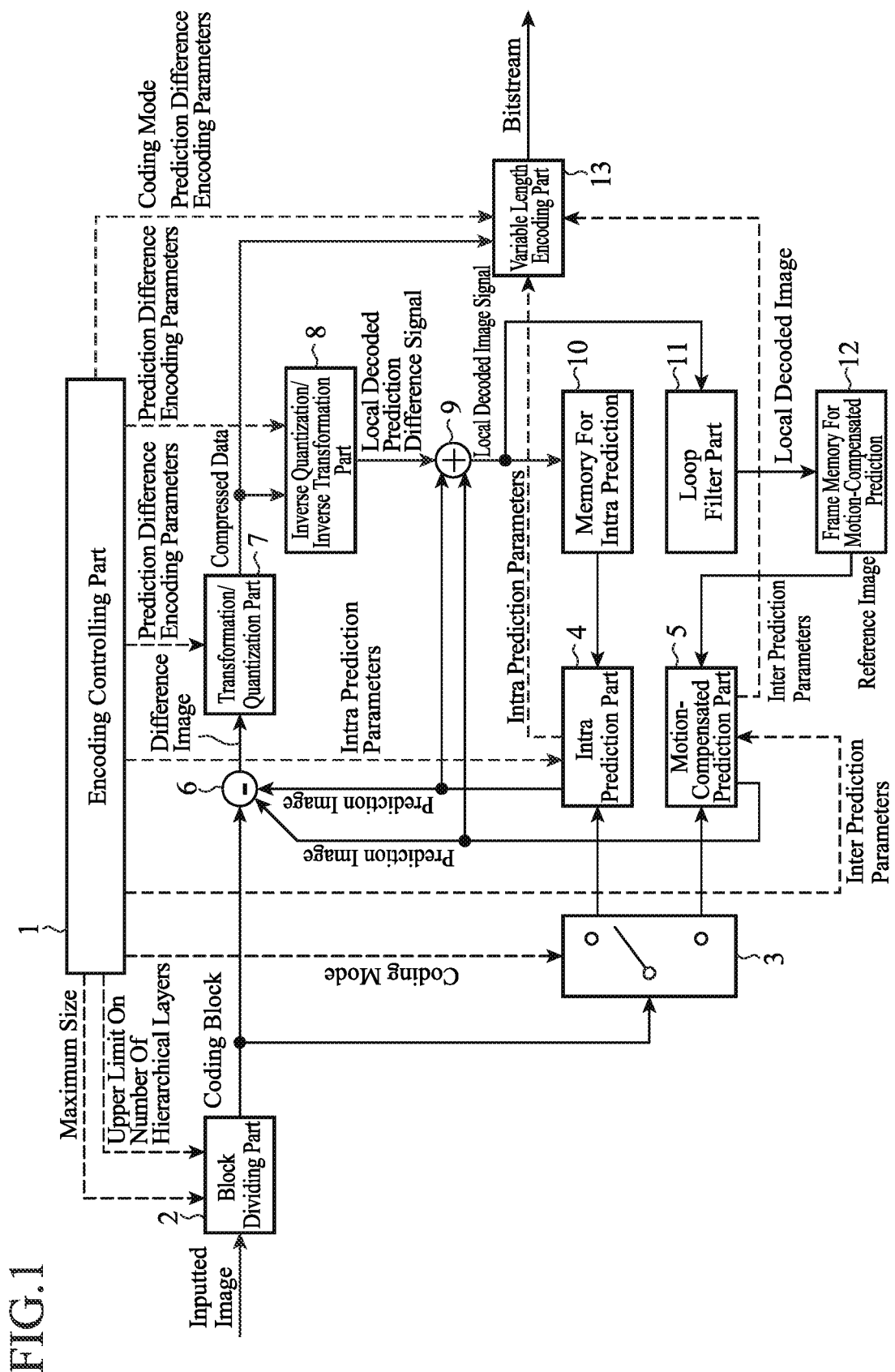
FIG. 1 is a block diagram showing an image coding device in accordance with Embodiment 1 of the present invention.

FIG. 1 is a block diagram showing a moving image encoding device in accordance with Embodiment 1 of the present invention. Referring to FIG. 1, an encoding controlling part 1 carries out a process of determining a maximum size of each of coding blocks which is a unit to be processed at a time when an intra prediction process (intra-frame prediction process) or a motion-compensated prediction process (inter-frame prediction process) is carried out, and also determining an upper limit on the number of hierarchical layers in a hierarchy in which each of the coding blocks having the maximum size is hierarchically divided into blocks. The encoding controlling part 1 also carries out a process of selecting a coding mode suitable for each of the coding blocks into which each coding block having the maximum size is divided hierarchically from one or more available coding modes (one or more intra coding modes and one or more inter coding modes). The encoding controlling part 1 further carries out a process of determining a quantization parameter and a transformation block size which are used when a difference image is compressed for each coding block, and also determining an intra prediction parameter or an inter prediction parameter which is used when a prediction process is carried out for each coding block. The quantization parameter and the transformation block size are included in prediction difference encoding parameters, and these prediction error encoding parameters are outputted to a transformation/quantization part 7, an inverse quantization/inverse transformation part 8, a variable length encoding part 13, and so on. The encoding controlling part 1 constructs an encoding controlling unit.

A block dividing part 2 carries out a process of, when receiving a video signal showing an inputted image (current picture), dividing the inputted image into coding blocks each having the maximum size determined by the encoding controlling part 1, and also dividing each of the coding blocks into blocks hierarchically until the number of hierarchical layers reaches the upper limit on the number of hierarchical layers which is determined by the encoding controlling part 1. The block dividing part 2 constructs a block dividing unit. A selection switch 3 carries out a process of, when the coding mode selected by the encoding controlling part 1 for a coding block, which is generated through the division by the block dividing part 2, is an intra coding mode, outputting the coding block to an intra prediction part 4, and, when the coding mode selected by the encoding controlling part 1 for the coding block, which is generated through the division by the block dividing part 2, is an inter coding mode, outputting the coding block to a motion-compensated prediction part 5.

The intra prediction part 4 carries out a process of, when receiving the coding block, which is generated through the division by the block dividing part 2, from the selection switch 3, carrying out an intra prediction process based on the intra prediction parameter outputted thereto from the encoding controlling part on the coding block to generate a prediction image by using already-encoded pixels which are stored in a memory 10 for intra prediction and which are adjacent to the coding block or already-encoded pixels which are adjacent to a higher layer coding block to which the coding block belongs. The motion-compensated prediction part 5 carries out a process of, when an inter coding mode is selected by the encoding controlling part 1 as a coding mode corresponding to the coding block, which is generated through the division by the block dividing part 2, performing a motion-compensated prediction process on the coding block to generate a prediction image by using one or more frames of reference images stored in a motion-compensated prediction frame memory 12 on the basis of the inter prediction parameter outputted thereto from the encoding controlling part 1. A prediction image generating unit is comprised of the selection switch 3, the intra prediction part 4, and the motion-compensated prediction part 5.

A subtracting part 6 carries out a process of subtracting the prediction image generated by the intra prediction part 4 or the motion-compensated prediction part 5 from the coding block, which is generated through the division by the block dividing part 2, to generate a difference image (=the coding block−the prediction image). The subtracting part 6 constructs a difference image generating unit. The transformation/quantization part 7 carries out a process of performing an orthogonal transformation process (e.g., a DCT (discrete cosine transform) or an orthogonal transformation process, such as a KL transform, in which bases are designed for a specific learning sequence in advance) on the difference image generated by the subtracting part 6 in units of a block having a transformation block size included in the prediction difference encoding parameters outputted from the encoding controlling part 1, and also quantizing the transform coefficients of the difference image by using a quantization parameter included in the prediction difference encoding parameters to output the transform coefficients quantized thereby as compressed data of the difference image. The transformation/quantization part 7 constructs an image compression unit.

The inverse quantization/inverse transformation part 8 carries out a process of inverse-quantizing the compressed data outputted thereto from the transformation/quantization part 7 by using the quantization parameter included in the prediction difference encoding parameters outputted from the encoding controlling part 1, and performing an inverse transformation process (e.g., an inverse DCT (inverse discrete cosine transform) or an inverse transformation process such as an inverse KL transform) on the compressed data inverse-quantized thereby to output the compressed data on which the inverse quantization/inverse transformation part has carried out the inverse transformation process as a local decoded prediction difference signal.

An adding part 9 carries out a process of adding the local decoded prediction difference signal outputted thereto from the inverse quantization/inverse transformation part 8 and the prediction signal showing the prediction image generated by the intra prediction part 4 or the motion-compensated prediction part 5 to generate a local decoded image signal showing a local decoded image. The memory 10 for intra prediction is a recording medium, such as a RAM, for storing the local decoded image shown by the local decoded image signal generated by the adding part 9 as an image which the intra prediction part 4 will use when performing the intra prediction process the next time.

A loop filter part 11 carries out a process of compensating for an encoding distortion included in the local decoded image signal generated by the adding part 9, and outputting the local decoded image shown by the local decoded image signal on which the loop filter part has carried out the encoding distortion compensation to the motion-compensated prediction frame memory 12 as a reference image. The motion-compensated prediction frame memory 12 is a recording medium, such as a RAM, for storing the local decoded image on which the loop filter part 11 has carried out the filtering process as a reference image which the motion-compensated prediction part 5 will use when performing the motion-compensated prediction process the next time.

The variable length encoding part 13 carries out a process of variable-length-encoding the compressed data outputted thereto from the transformation/quantization part 7, the coding mode and the prediction difference encoding parameters which are outputted thereto from the encoding controlling part 1, and the intra prediction parameter outputted thereto from the intra prediction part 4 or the inter prediction parameter outputted thereto from the motion-compensated prediction part 5 to generate a bitstream into which coded data of the compressed data, coded data of the coding mode, coded data of the prediction difference encoding parameters, and coded data of the intra prediction parameter or the inter prediction parameter are multiplexed. The variable length encoding part 13 constructs a variable length encoding unit.

Figure 2:
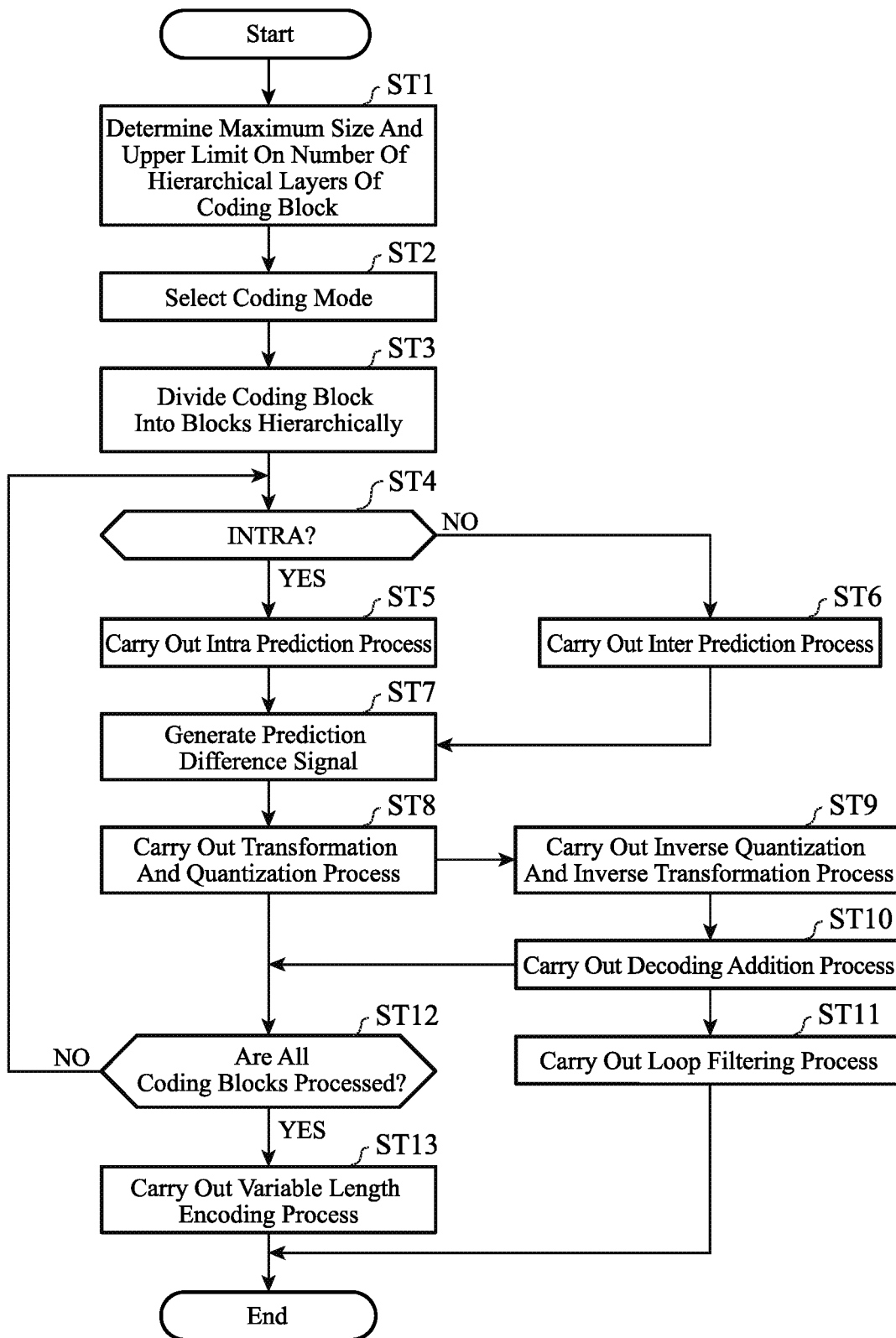
FIG. 2 is a flow chart showing processing carried out by the image coding device in accordance with Embodiment 1 of the present invention.

In the example of FIG. 1, the encoding controlling part 1, the block dividing part 2, the selection switch 3, the intra prediction part 4, the motion-compensated prediction part 5, the subtracting part 6, the transformation/quantization part 7, the inverse quantization/inverse transformation part 8, the adding part 9, the loop filter part 11, and the variable length encoding part 13, which are the components of the moving image encoding device, can consist of pieces of hardware for exclusive use (e.g., integrated circuits in each of which a CPU is mounted, one chip microcomputers, or the like), respectively. As an alternative, the moving image encoding device can consist of a computer, and part or all of a program in which the processes carried out by the encoding controlling part 1, the block dividing part 2, the selection switch 3, the intra prediction part 4, the motion-compensated prediction part 5, the subtracting part 6, the transformation/quantization part 7, the inverse quantization/inverse transformation part 8, the adding part 9, the loop filter part 11, and the variable length encoding part 13 are described can be stored in a memory of the computer and the CPU of the computer can be made to execute the program stored in the memory. FIG. 2 is a flow chart showing the processing carried out by the moving image encoding device in accordance with Embodiment 1 of the present invention.

Figure 10:
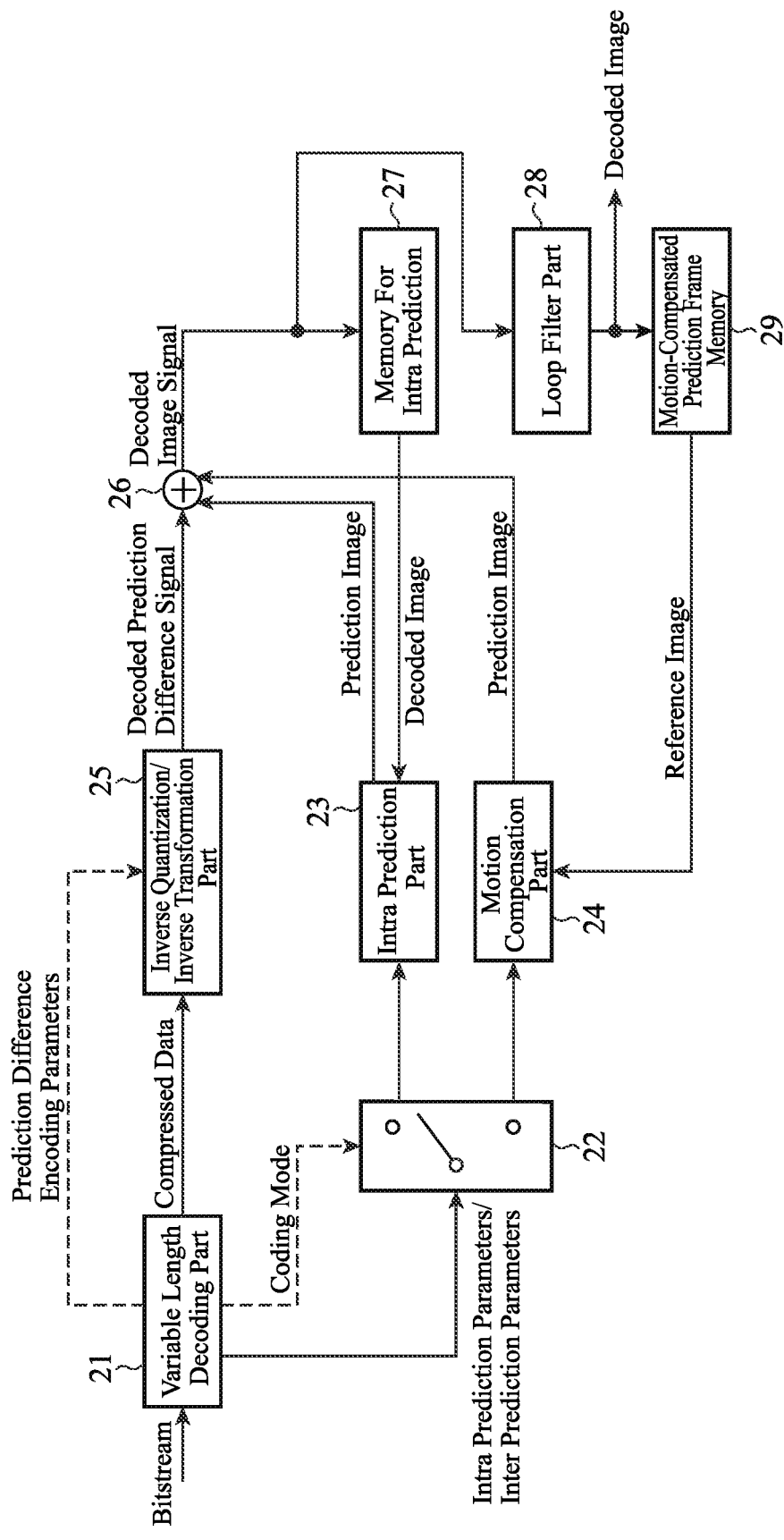
FIG. 10 is a block diagram showing an image decoding device in accordance with Embodiment 1 of the present invention.

FIG. 10 is a block diagram showing a moving image decoding device in accordance with Embodiment 1 of the present invention. Referring to FIG. 10, a variable length decoding part 21 carries out a process of specifying the maximum size of each coding block which is a unit to be processed at a time when an intra prediction process or a motion-compensated prediction process is carried out, and the number of hierarchical layers in the hierarchy in which each of the coding blocks having the maximum size is hierarchically divided into blocks to specify the coded data associated with each of the coding blocks having the maximum size and the coded data associated with each of the coding blocks into which each of the coding blocks having the maximum size is divided hierarchically from the coded data multiplexed into the bitstream, and variable-length-decoding the coded data associated with each of the coding blocks to acquire the compressed data, the coding mode, the prediction difference encoding parameters, and the intra prediction parameter or the inter prediction parameter, which are associated with each of the coding blocks, and outputting the compressed data and the prediction difference encoding parameters to an inverse quantization/inverse transformation part 25, and also outputting the coding mode, and the intra prediction parameter or the inter prediction parameter to a selection switch 22. The variable length decoding part 21 constructs a variable length decoding unit.

The selection switch 22 carries out a process of, when the coding mode associated with the coding block, which is outputted from the variable length decoding part 21, is an intra coding mode, outputting the intra prediction parameter outputted thereto from the variable length decoding part 21 to an intra prediction part 23, and, when the coding mode is an inter coding mode, outputting the inter prediction parameter outputted thereto from the variable length decoding part 21 to a motion compensation part 24.

The intra prediction part 23 carries out a process of performing an intra-frame prediction process on the coding block to generate a prediction image by using either already-decoded pixels which are stored in a memory 27 for intra prediction and which are adjacent to the coding block or already-decoded pixels which are adjacent to a higher layer coding block to which the coding block belongs on the basis of the intra prediction parameter outputted thereto from the selection switch 22. The motion compensation part 24 carries out a process of performing a motion-compensated prediction process on the coding block to generate a prediction image by using one or more frames of reference images stored in a motion-compensated prediction frame memory 29 on the basis of the inter prediction parameter outputted thereto from the selection switch 22. A prediction image generating unit is comprised of the selection switch 22, the intra prediction part 23, and the motion compensation part 24.

The inverse quantization/inverse transformation part 25 carries out a process of inverse-quantizing the compressed data associated with the coding block, which are outputted thereto from the variable length decoding part 21, by using the quantization parameter included in the prediction difference encoding parameters outputted thereto from the variable length decoding part 21, and performing an inverse transformation process (e.g., an inverse DCT (inverse discrete cosine transform) or an inverse transformation process such as an inverse KL transform) on the compressed data inverse-quantized thereby in units of a block having the transformation block size included in the prediction difference encoding parameters, and outputting the compressed data on which the inverse quantization/inverse transformation part has carried out the inverse transformation process as a decoded prediction difference signal (signal showing a pre-compressed difference image). The inverse quantization/inverse transformation part 26 constructs a difference image generating unit.

An adding part 26 carries out a process of adding the decoded prediction difference signal outputted thereto from the inverse quantization/inverse transformation part 25 and the prediction signal showing the prediction image generated by the intra prediction part 23 or the motion compensation part 24 to generate a decoded image signal showing a decoded image. The adding part 26 constructs a decoded image generating unit. The memory 27 for intra prediction is a recording medium, such as a RAM, for storing the decoded image shown by the decoded image signal generated by the adding part 26 as an image which the intra prediction part 23 will use when performing the intra prediction process the next time.

A loop filter part 58 carries out a process of compensating for an encoding distortion included in the decoded image signal generated by the adding part 26, and outputting the decoded image shown by the decoded image signal on which the loop filter part has carried out the encoding distortion compensation to the motion-compensated prediction frame memory 29 as a reference image and also outputting the decoded image to outside the moving image decoding device as a reproduced image. The motion-compensated prediction frame memory 29 is a recording medium, such as a RAM, for storing the decoded image on which the loop filter part 28 has carried out the filtering process as a reference image which the motion compensation part 24 will use when performing the motion-compensated prediction process the next time.

Figure 11:
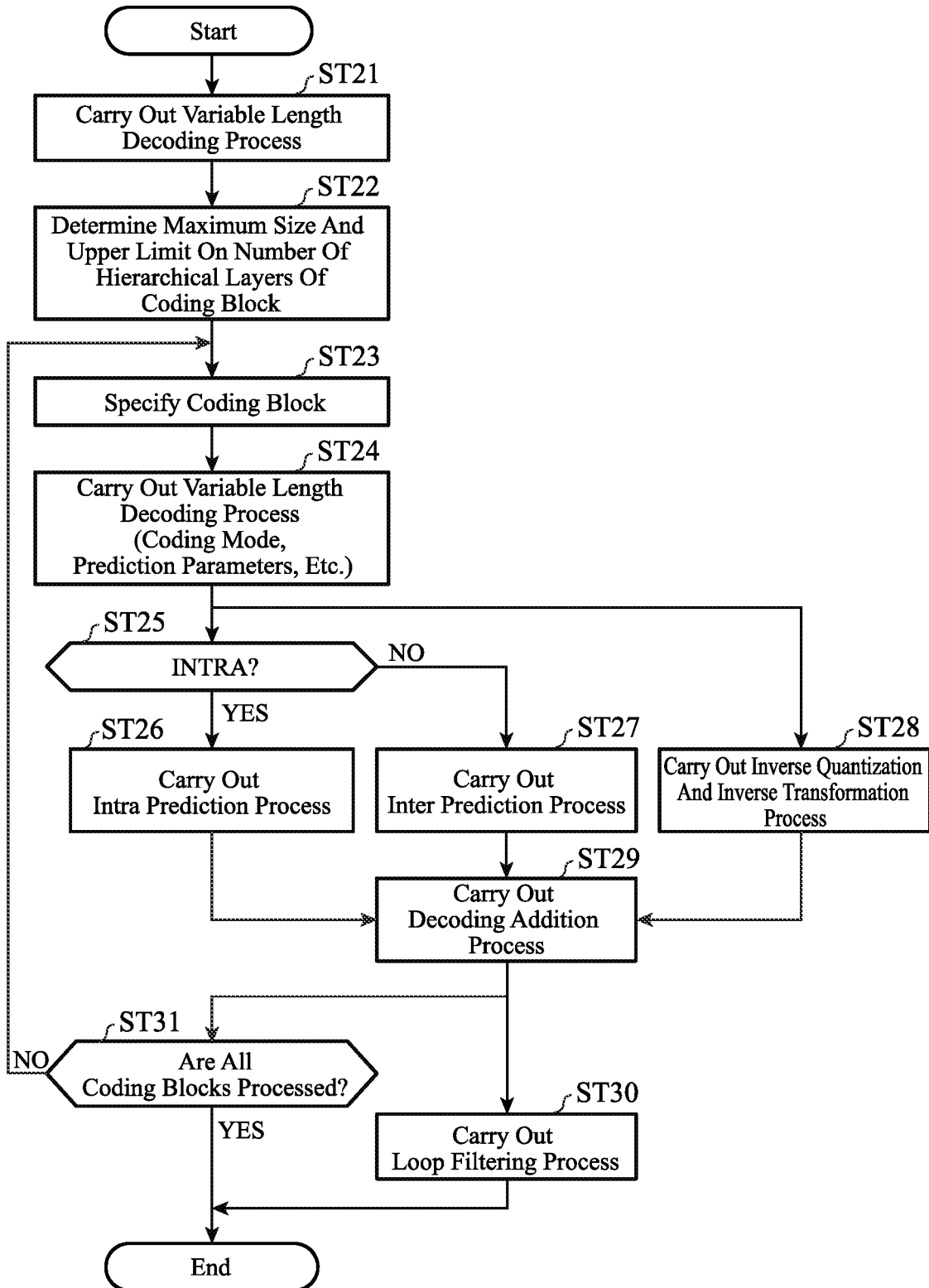
FIG. 11 is a flow chart showing processing carried out by the image decoding device in accordance with Embodiment 1 of the present invention.

In the example of FIG. 10, the variable length decoding part 21, the selection switch 22, the intra prediction part 23, the motion compensation part 24, the inverse quantization/inverse transformation part 25, the adding part 26, and the loop filter part 28, which are the components of the moving image decoding device, can consist of pieces of hardware for exclusive use (e.g., integrated circuits in each of which a CPU is mounted, one chip microcomputers, or the like), respectively. As an alternative, the moving image decoding device can consist of a computer, and part or all of a program in which the processes carried out by the variable length decoding part 21, the selection switch 22, the intra prediction part 23, the motion compensation part 24, the inverse quantization/inverse transformation part 25, the adding part 26, and the loop filter part 28 are described can be stored in a memory of the computer and the CPU of the computer can be made to execute the program stored in the memory. FIG. 11 is a flow chart showing the processing carried out by the moving image decoding device in accordance with Embodiment 1 of the present invention.

The moving image encoding device in accordance with this Embodiment 1 is characterized in that the moving image encoding device adapts itself to a local change of a video signal in space and time directions to divide the video signal into regions of various sizes, and carries out intra-frame and inter-frame adaptive encoding. In general, a video signal has a characteristic of its complexity varying locally in space and time. There can be a case in which a pattern having a uniform signal characteristic in a relatively large image area, such as a sky image or a wall image, or a pattern having a complicated texture pattern in a small image area, such as a person image or a picture including a fine texture, also coexists on a certain video frame from the viewpoint of space.

Also from the viewpoint of time, a relatively large image area, such as a sky image or a wall image, has a small local change in a time direction in its pattern, while an image of a moving person or object has a larger temporal change because its outline has a movement of a rigid body and a movement of a non-rigid body with respect to time. Although a process of generating a prediction difference signal having small signal power and small entropy by using temporal and spatial prediction, thereby reducing the whole code amount, is carried out in the encoding process, the code amount of parameters used for the prediction can be reduced as long as the parameters can be applied uniformly to as large an image signal region as possible. On the other hand, because the amount of errors occurring in the prediction increases when the same prediction parameter is applied to a large image area in an image signal pattern having a large change in time and space, the code amount of the prediction difference signal cannot be reduced. Therefore, it is desirable to reduce the size of a region which is subjected to the prediction process when performing the prediction process on an image area having a large change in time and space, thereby reducing the electric power and entropy of the prediction difference signal, even though the data volume of the prediction parameter which is used for the prediction process is increased. In order to carry out an encoding process which is adapted for such the typical characteristics of a video signal, the moving image encoding device in accordance with this Embodiment 1 adopts a structure of hierarchically dividing each region having a predetermined maximum block size of the video signal into blocks, and adapting the prediction process and the encoding process of encoding a prediction difference for each of the blocks into which each region is divided.

A video signal which is to be processed by the moving image encoding device in accordance with this Embodiment 1 can be an arbitrary video signal in which each video frame consists of a series of digital samples (pixels) in two dimensions, horizontal and vertical, such as a YUV signal which consists of a luminance signal and two color difference signals, a color video image signal in arbitrary color space, such as an RGB signal, outputted from a digital image sensor, a monochrome image signal, or an infrared image signal. The gradation of each pixel can be an 8-bit, 10-bit, or 12-bit one. In the following explanation, the inputted video signal is a YUV signal unless otherwise specified. It is further assumed that the two color difference components U and V are signals having a 4:2:0 format which are subsampled with respect to the luminance component Y. A data unit to be processed which corresponds to each frame of the video signal is referred to as a "picture." In this Embodiment 1, a "picture" is explained as a video frame signal on which progressive scanning has been carried out. When the video signal is an interlaced signal, a "picture" can be alternatively a field image signal which is a unit which constructs a video frame.

Next, the operation of the moving image encoding device and the operation of the moving image decoding device will be explained.

First, the processing carried out by the moving image encoding device shown in FIG. 1 will be explained. First, the encoding controlling part 1 determines a maximum size of each of coding blocks which is a unit to be processed at a time when an intra prediction process (intra-frame prediction process) or a motion-compensated prediction process (inter-frame prediction process) is carried out, and also determines an upper limit on the number of hierarchical layers in a hierarchy in which each of the coding blocks having the maximum size is hierarchically divided into blocks (step ST1 of FIG. 2).

As a method of determining the maximum size of each of coding blocks, for example, there is considered a method of determining a maximum size for all the pictures according to the resolution of the inputted image. Further, there can be considered a method of quantifying a variation in the complexity of a local movement of the inputted image as a parameter and then determining a small size for a picture having a large and vigorous movement while determining a large size for a picture having a small movement. As a method of determining the upper limit on the number of hierarchical layers, for example, there can be considered a method of increasing the depth of the hierarchy, i.e., the number of hierarchical layers to make it possible to detect a finer movement as the inputted image has a larger and more vigorous movement, or decreasing the depth of the hierarchy, i.e., the number of hierarchical layers as the inputted image has a smaller movement.

The encoding controlling part 1 also selects a coding mode corresponding to each of the coding blocks into which each coding block having the maximum size is divided hierarchically from one or more available coding modes (M intra coding modes and N inter coding modes) (step ST2). The M intra coding modes which are prepared in advance will be mentioned below. When each of the coding block into which the inputted image is hierarchically divided by the block dividing unit 2 which will be mentioned below is further divided into partitions, the encoding controlling part can select a coding mode corresponding to each of the partitions. Hereafter, an explanation will be made in this Embodiment 1 by assuming that each of the coding blocks is further divided into partitions. Although a detailed explanation of a selection method of selecting a coding mode for use in the encoding controlling part 1 will be omitted because the selection method is a known technique, there is a method of carrying out an encoding process on each coding block by using an arbitrary available coding mode to examine the encoding efficiency and select a coding mode having the highest level of encoding efficiency from among a plurality of available coding modes, for example.

The encoding controlling part 1 further determines a quantization parameter and a transformation block size which are used when a difference image is compressed for each partition belonging to each coding block, and also determines an intra prediction parameter or an inter prediction parameter which is used when a prediction process is carried out. The encoding controlling part 1 outputs prediction difference encoding parameters including the quantization parameter and the transformation block size to the transformation/quantization part 7, the inverse quantization/inverse transformation part 8, and the variable length encoding part 13. The encoding controlling part also outputs the prediction difference encoding parameters to the intra prediction part 4 as needed.

Figure 3:
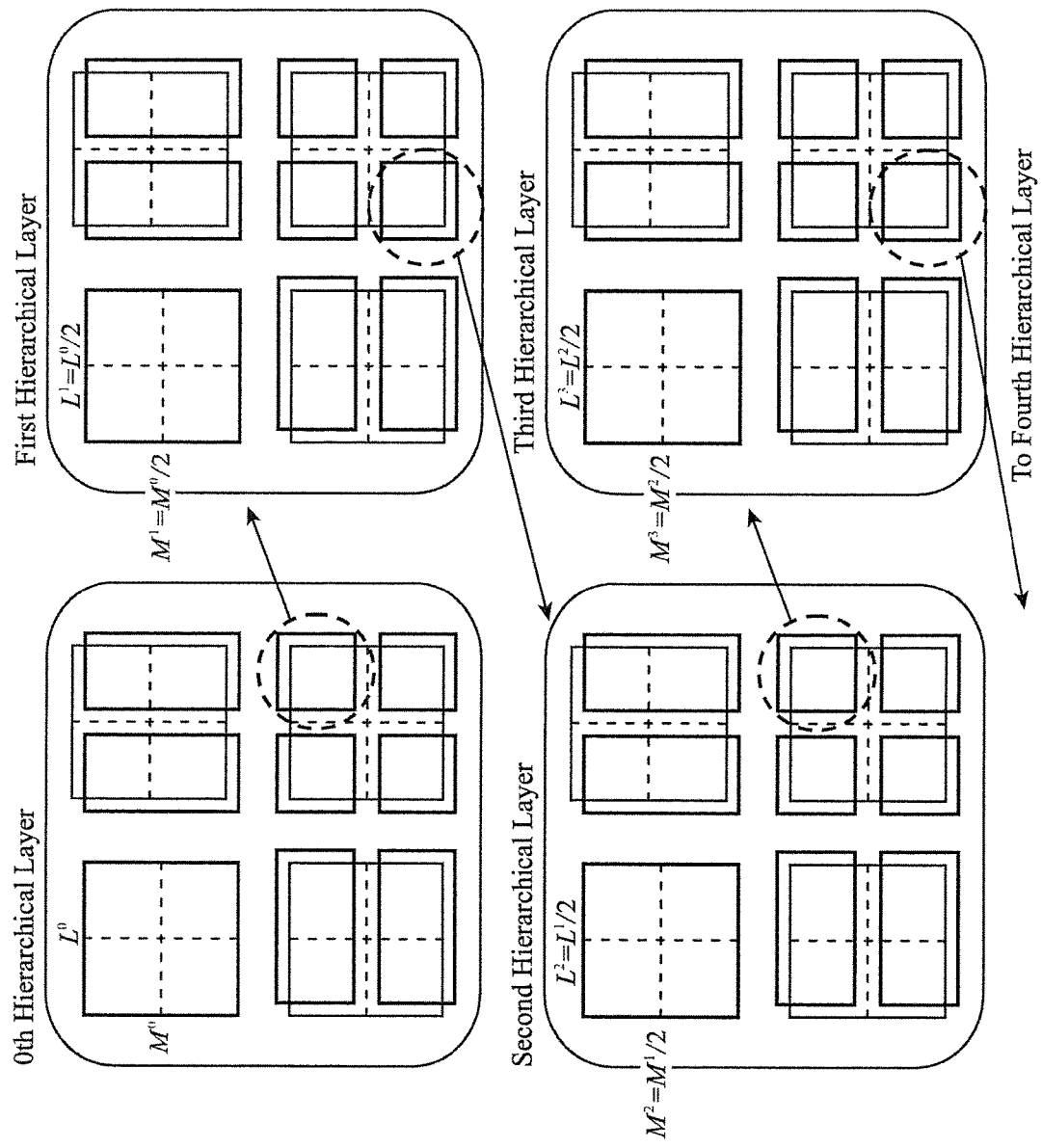
FIG. 3 is an explanatory drawing showing a state in which each coding block having a maximum size is hierarchically divided into a plurality of coding blocks.

When receiving the video signal showing the inputted image, the block dividing part 2 divides the inputted image into coding blocks each having the maximum size determined by the encoding controlling part 1, and also divides each of the coding blocks into blocks hierarchically until the number of hierarchical layers reaches the upper limit on the number of hierarchical layers which is determined by the encoding controlling part 1. The block dividing part further divides each of the coding blocks into partitions (step ST3). FIG. 3 is an explanatory drawing showing a state in which each coding block having the maximum size is hierarchically divided into a plurality of coding blocks. In the example of FIG. 3, each coding block having the maximum size is a coding block $B^0$ in the 0th hierarchical layer, and its luminance component has a size of $(L^0, M^0)$. Further, in the example of FIG. 3, by carrying out the hierarchical division with this coding block $B^0$ having the maximum size being set as a starting point until the depth of the hierarchy reaches a predetermined depth which is set separately according to a quadtree structure, coding blocks $B^n$ can be acquired.

At the depth of n, each coding block $B^n$ is an image area having a size of $(L^n, M^n)$. Although $L^n$ can be the same as or differ from $M^n$, the case of $L^n=M^n$ is shown in the example of FIG. 3. Hereafter, the size of each coding block $B^n$ is defined as the size of ($L^n$, $M^n$) in the luminance component of the coding block $B^n$.

Because the block dividing part 2 carries out a quadtree division, ($L^{n+1}$, $M^{n+1}$)=($L^n/2$, $M^n/2$) is always established. In the case of a color video image signal (4:4:4 format) in which all the color components have the same sample number, such as an RGB signal, all the color components have a size of ($L^n$, $M^n$), while in the case of handling a 4:2:0 format, a corresponding color difference component has an encoding block size of ($L^n/2$, $M^n/2$). Hereafter, a coding mode selectable for each coding block $B^n$ in the nth hierarchical layer is expressed as $m(B^n)$.

In the case of a color video signal which consists of a plurality of color components, the coding mode $m(B^n)$ can be formed in such a way that an individual mode is used for each color component. Hereafter, an explanation will be made by assuming that the coding mode $m(B^n)$ indicates the one for the luminance component of each coding block having a 4:2:0 format in a YUV signal unless otherwise specified. The coding mode $m(B^n)$ can be one of one or more intra coding modes (generically referred to as "INTRA") or one or more inter coding modes (generically referred to as "INTER"), and the encoding controlling part 1 selects, as the coding mode $m(B^n)$, a coding mode with the highest degree of encoding efficiency for each coding block $B^n$ from among all the coding modes available in the picture currently being processed or a subset of these coding modes, as mentioned above.

Each coding block $B^n$ is further divided into one or more prediction units (partitions) by the block dividing part, as shown in FIG. 3. Hereafter, each partition belonging to each coding block $B^n$ is expressed as $P_i^n$ (i shows a partition number in the nth hierarchical layer). FIG. 8 is an explanatory drawing showing a partition $P_i^n$ belonging to a coding block $B^n$. How the division of each coding block $B^n$ into partitions $P_i^n$ belonging to the coding block $B^n$ is carried out is included as information in the coding mode $m(B^n)$. While the prediction process is carried out on each of all the partitions $P_i^n$ according to the coding mode $m(B^n)$, an individual prediction parameter can be selected for each partition $P_i^n$.

Figure 4:
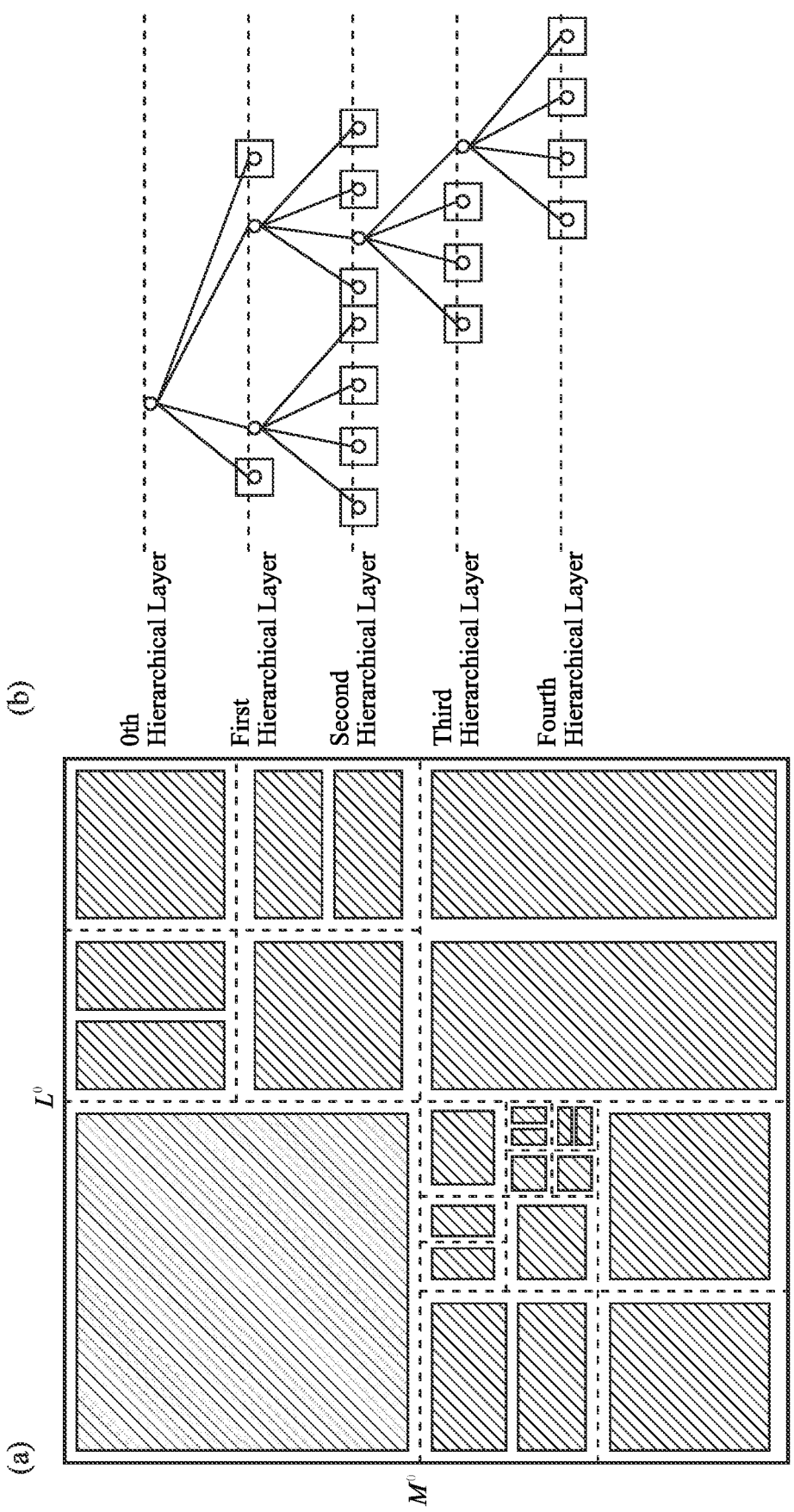
FIG. 4($a$) is an explanatory drawing showing a distribution of partitions into which a block to encoded is divided, and FIG. 4($b$) is an explanatory drawing showing a state in which a coding mode m($B^n$) is assigned to each of the partitions after a hierarchical layer division is performed by using a quadtree graph.

The encoding controlling part 1 produces such a block division state as shown in, for example, FIG. 4 for a coding block having the maximum size, and then determines coding blocks $B^n$. Hatched shown in FIG. 4(a) show a distribution of partitions into which the coding block having the maximum size is divided, and FIG. 4(b) shows a situation in which coding modes $m(B^n)$ are respectively assigned to the partitions generated through the hierarchical layer division by using a quadtree graph. Each node enclosed by □ shown in FIG. 4(b) is a node (coding block $B^n$) to which a coding mode $m(B^n)$ is assigned.

When the encoding controlling part 1 selects an intra coding mode ($m(B^n)\in$INTRA), the selection switch 3 outputs each partition $P_i^n$ belonging to the coding block $B^n$ which is generated through the division by the block dividing unit 2 to the intra prediction part 4, whereas when the encoding controlling part 1 selects an inter coding mode ($m(B^n)\in$INTER), the selection switch 3 outputs each partition $P_i^n$ belonging to the coding block $B^n$ to the motion-compensated prediction part 5.

When receiving each partition $P_i^n$ belonging to the coding block $B^n$ from the selection switch 3 (step ST4), the intra prediction part 4 carries out an intra prediction process on each partition $P_i^n$ to generate an intra prediction image ($P_i^n$) on the basis of the intra prediction parameter determined by the encoding controlling part 1 (step ST5), as will be concretely described below. Hereafter, in this specification, $P_i^n$ denotes a partition and ($P_i^n$) denotes a prediction image of the partition $P_i^n$.

Because the moving image decoding device also needs to generate an intra prediction image ($P_i^n$) which is completely the same as the intra prediction image, the intra prediction parameter used for the generation of the intra prediction image ($P_i^n$) are multiplexed into the bitstream by the variable length encoding part 13. The number of intra prediction directions each of which can be selected as an intra prediction parameter can be configured in such a way as to differ according to the size of the target block to be processed. The number of intra prediction directions selectable for a large-size partition can be decreased because the efficiency of intra prediction decreases, while the number of intra prediction directions selectable for a small-size partition can be increased. For example, 34 intra prediction directions can be provided for a 4×4-pixel partition and an 8×8-pixel partition, 17 intra prediction directions can be provided for a 16×16-pixel partition, and 9 intra prediction directions can be provided for a 32×32-pixel partition.

When receiving each partition $P_i^n$ belonging to the coding block $B^n$ from the selection switch 3 (step ST4), the motion-compensated prediction part 5 carries out an inter prediction process on each partition $P_i^n$ to generate an inter prediction image ($P_i^n$) on the basis of the inter prediction parameter determined by the encoding controlling part 1 (step ST6). More specifically, the motion-compensated prediction part 5 carries out a motion-compensated prediction process on each partition $P_i^n$ to generate an inter prediction image ($P_i^n$) by using one or more frames of reference images stored in the motion-compensated prediction frame memory 12 on the basis of the inter prediction parameter outputted thereto from the encoding controlling part 1. Because the moving image decoding device also needs to generate an inter prediction image ($P_i^n$) which is completely the same as the inter prediction image, the inter prediction parameter used for the generation of the inter prediction image ($P_i^n$) are multiplexed into the bitstream by the variable length encoding part 13.

When receiving the prediction image ($P_i^n$) from the intra prediction part 4 or the motion-compensated prediction part 5, the subtracting part 6 subtracts the prediction image ($P_i^n$) from the partition $P_i^n$ belonging to the coding block $B^n$ which is generated through the division by the block dividing unit 2 to generate a prediction difference signal $e_i^n$ showing a difference image (step ST7). When the subtracting part 6 generates the prediction difference signal $e_i^n$, the transformation/quantization part 7 carries out a transformation process (e.g., a DCT (discrete cosine transform) or an orthogonal transformation process, such as a KL transform, in which bases are designed for a specific learning sequence in advance) on the prediction difference signal $e_i^n$ in units of a block having the transformation block size included in the prediction difference encoding parameters outputted thereto from the encoding controlling part 1, and also quantizes the transform coefficients of the prediction difference signal $e_i^n$ by using the quantization parameter included in the prediction difference encoding parameters and outputs compressed data of the difference image which are the transform coefficients quantized thereby to the inverse quantization/inverse transformation part 8 and the variable length encoding part 13 (step ST8).

When receiving the compressed data of the difference image from the transformation/quantization part 7, the inverse quantization/inverse transformation part 8 inverse-quantizes the compressed data of the difference image by using the quantization parameter included in the prediction difference encoding parameters outputted thereto from the encoding controlling part 1, performs an inverse transformation process (e.g., an inverse DCT (inverse discrete cosine transform) or an inverse transformation process such as an inverse KL transform) on the compressed data inverse-quantized thereby in units of a block having the transformation block size included in the prediction difference encoding parameters, and outputs the compressed data on which the inverse quantization/inverse transformation part has carried out the inverse transformation process to the adding part 9 as a local decoded prediction difference signal (step ST9).

When receiving the local decoded prediction difference signal from the inverse quantization/inverse transformation part 8, the adding part 9 adds the local decoded prediction difference signal and the prediction signal showing the prediction image ($P_i^n$) generated by the intra prediction part 4 or the motion-compensated prediction part 5 to generate a local decoded image signal showing a local decoded partition image or a local decoded coding block image (referred to as a local decoded image from here on) which is a group of local decoded partition images, and outputs the local decoded image signal to the loop filter unit 11 (step ST10). Further, this local decoded image is stored in the memory 10 for intra prediction in order that it can be used for intra prediction.

When receiving the local decoded image signal from the adding part 9, the loop filter part 11 compensates for an encoding distortion included in the local decoded image signal, and stores the local decoded image shown by the local decoded image signal on which the loop filter part has carried out the encoding distortion compensation in the motion-compensated prediction frame memory 12 as a reference image (step ST11). The loop filter part 11 can carry out the filtering process for each coding block having the maximum size of the local decoded image signal inputted thereto or for each coding block of the local decoded image signal. As an alternative, after the local decoded image signals corresponding to all the macroblocks of one screen are inputted thereto, the loop filter part can carry out the filtering process on all the macroblocks of the one screen at a time.

The moving image encoding device repeatedly carries out the processes of steps ST4 to ST10 until the moving image encoding device completes the processing on each partition $P_i^n$ belonging to each of all the coding blocks $B^n$ into which the inputted image is divided by the block dividing part 2 (step ST12). The variable length encoding part 13 carries out a process of variable-length-encoding the compressed data outputted thereto from the transformation/quantization part 7, the coding mode and the prediction difference encoding parameters which are outputted thereto from the encoding controlling part 1, and the intra prediction parameter outputted thereto from the intra prediction part 4 or the inter prediction parameter outputted thereto from the motion-compensated prediction part 5 to generate a bitstream into which coded data of the compressed data, coded data of the coding mode, coded data of the prediction difference encoding parameters, and coded data of the intra prediction parameter or the inter prediction parameter are multiplexed (step ST13).

Next, the process carried out by the intra prediction part 4 will be explained concretely. FIG. 5 is an explanatory drawing showing an example of the intra prediction parameter (intra prediction mode) which can be selected for each partition $P_i^n$ belonging to the coding block $B^n$. In the example of FIG. 5, prediction direction vectors corresponding to intra prediction modes are shown, and it is designed that a relative angle between prediction direction vectors becomes small with increase in the number of selectable intra prediction modes.

Figure 6:
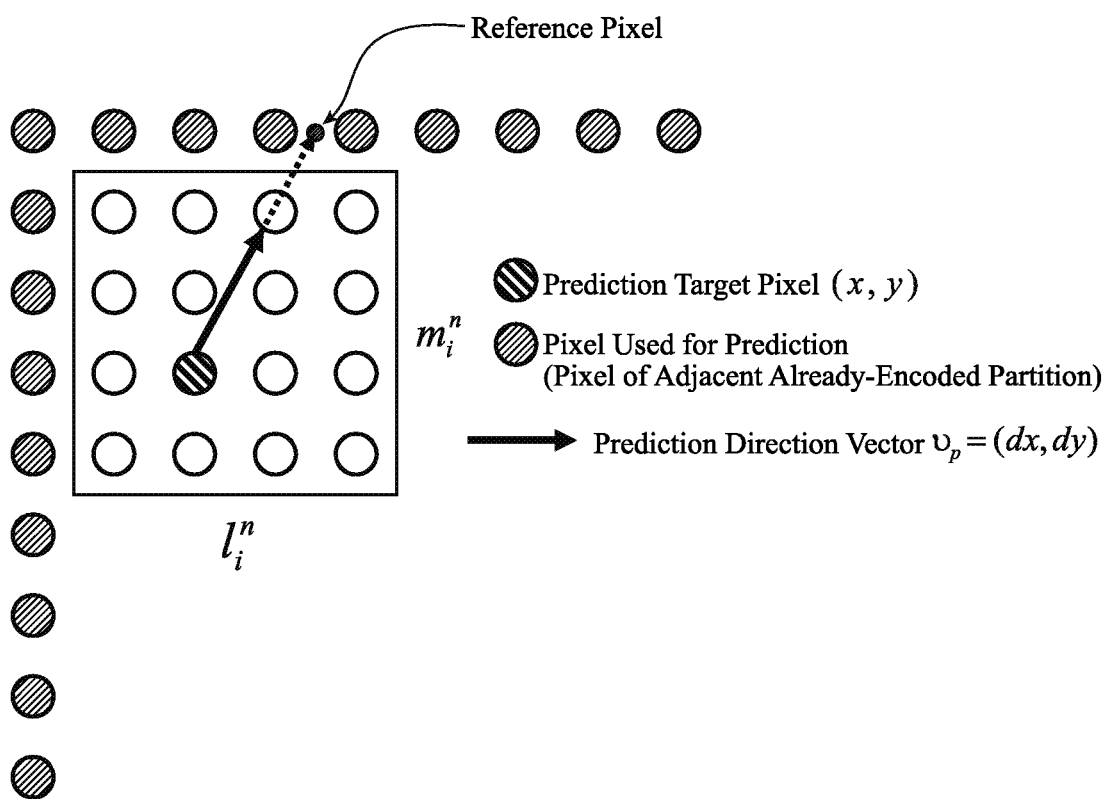
FIG. 6 is an explanatory drawing showing an example of pixels which are used when generating a predicted value of each pixel in a partition $P_i^n$ in the case of $l_i^n=m_i^n=4$.

Hereafter, an intra process of generating an intra prediction signal of the luminance signal of a partition $P_i^n$ on the basis of the intra prediction parameter (intra prediction mode) for the luminance signal will be explained. It is assumed that the size of the partition $P_i^n$ is $l_i^n \times m_i^n$ pixels. FIG. 6 is an explanatory drawing showing an example of pixels which are used when generating a predicted value of each pixel in the partition $P_i^n$ in the case of $l_i^n = m_i^n = 4$. Although the ($2 \times l_i^n + 1$) pixels in an already-encoded upper partition which is adjacent to the partition $P_i^n$ and the ($2 \times m_i^n$) pixels in an already-encoded left partition which is adjacent to the partition $P_i^n$ are defined as the pixels used for prediction in the example of FIG. 6, a smaller number of pixels than the pixels shown in FIG. 6 can be alternatively used for prediction. Although one row or column of pixels which are adjacent to the partition $P_i^n$ are used for prediction in the example of FIG. 6, two rows or columns of pixels or three or more rows or columns of pixels can be alternatively used for prediction.

When an index value indicating the intra prediction mode for the partition $P_i^n$ is 2 (average prediction), the intra prediction part 4 generates a prediction image by using the average of the adjacent pixels in the upper partition and the adjacent pixels in the left partition as the predicted value of each pixel in the partition $P_i^n$. When the index value indicating the intra prediction mode is other than 2 (average prediction), the intra prediction part generates the predicted value of each pixel in the partition $P_i^n$ on the basis of a prediction direction vector $v_p = (dx, dy)$ shown by the index value. When relative coordinates in the partition $P_i^n$ (the upper left pixel of the partition is defined as the point of origin) of each pixel (prediction target pixel) for which the predicted value is generated are expressed as (x, y), the position of a reference pixel which is used for prediction is the point of intersection where the following L and one of the lines of adjacent pixels intersect each other.

$$L = \begin{pmatrix} x \\ y \end{pmatrix} + k v_p$$

where k is a positive scalar value.

When a reference pixel is located at an integer pixel position, the integer pixel is defined as the predicted value of the target pixel for prediction. In contrast, when a reference pixel is not located at an integer pixel position, an interpolation pixel which is generated from an integer pixel adjacent to the reference pixel is defined as the predicted value of the target pixel for prediction. In the example of FIG. 6, because the reference pixel is not at an integer pixel position, the average of the values of the two pixels which are adjacent to the reference pixel is determined as the predicted value of the target pixel for prediction. The intra prediction part can use not only the adjacent two pixels but also two or more adjacent pixels to generate an interpolation pixel and determine the value of this interpolation pixel as the predicted value.

Figure 7:
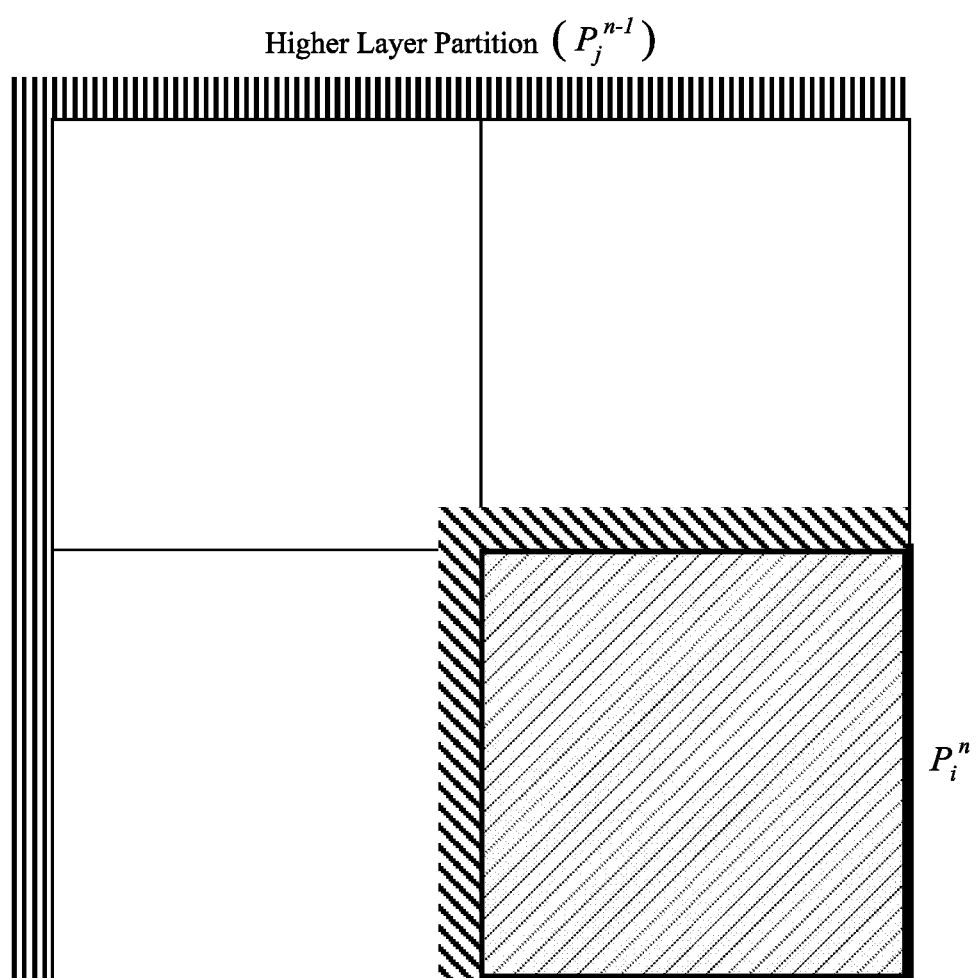
FIG. 7 is an explanatory drawing showing a relationship between a partition $P_i^n$ and a higher layer partition $P_i^{n-1}$.

According to the same procedure, the intra prediction part 4 generates prediction pixels for all the pixels of the luminance signal in the partition $P_i^n$ and outputs an intra prediction image ($P_i^n$) generated thereby. The intra prediction parameter used for the generation of the intra prediction image ($P_i^n$) are outputted to the variable length encoding part 13 in order to multiplex the intra prediction parameter into the bitstream, as mentioned above. While the intra prediction image ($P_i^n$) for the luminance signal in the partition $P_i^n$ is generated in the above-mentioned way, an intra prediction image ($P_j^{n-1}$) is generated for the luminance signal in a partition $P_j^{n-1}$ (j: the partition number of the higher layer partition in the (n−1)th hierarchical layer to which the partition $P_i^n$ belongs) in a similar manner, as shown in FIG. 7.

In this embodiment, as shown in FIG. 6, the intra prediction part is constructed in such a way as to be able to select a portion corresponding to the partition $P_i^n$, which is extracted from the intra prediction image ($P_j^{n-1}$) for the higher layer partition $P_j^{n-1}$, as a candidate for the intra prediction image ($P_i^n$) for the luminance signal in the partition $P_i^n$, in addition to the one that is generated from adjacent pixels of reference pixels adjacent to the partition $P_i^n$. More specifically, in a casein which nine directions of intra prediction mode including an average prediction are provided as the intra prediction modes, as shown in FIG. 9, nine prediction modes are further added when a higher layer partition exists.

Although an intra prediction is a means of predicting an unknown area in the screen from a known area, the prediction efficiency can be improved by selecting a candidate for the intra prediction image from prediction images having different properties because the image signal has a large local change in a space direction. Therefore, in the case in which the intra prediction part is constructed as above in such a way that the number of directions in the intra prediction modes is increased, the degree of similarity among prediction images generated is reduced as compared with the case in which the number of intra prediction modes is simply increased, and hence a candidate for the intra prediction image can be selected from prediction images having many variations. Therefore, an increase in the number of directions in the intra prediction modes can increase the degree of improvement in the encoding efficiency as compared with an increase in the number of intra prediction modes. Further, because a prediction image for a lower layer partition can be generated by extracting a part of a prediction image for a higher layer partition using the method in accordance with the present invention, an increase in the number of prediction directions provides an advantage of being able to reduce the amount of computation as compared with the case of an increase in the number of prediction modes.

The intra prediction part also carries out an intra prediction process based on the intra prediction parameter (intra prediction mode) on each of the color difference signals of the partition $P_i^n$ according to the same procedure as that according to which the intra prediction part carries out the intra prediction process on the luminance signal, and outputs the intra prediction parameter used for the generation of the intra prediction image to the variable length encoding part 13.

The variable length encoding part 13 variable-length-encodes the intra prediction parameter outputted thereto from the intra prediction part 4 and multiplexes the codeword of the intra prediction parameter into the bitstream, as mentioned above. When encoding the intra prediction parameter, the variable length encoding unit 13 can select a representative prediction direction vector (prediction direction representative vector) from among the prediction direction vectors of a plurality of directional predictions, express the intra prediction parameter by using an index indicating the prediction direction representative vector (prediction direction representative index) and an index indicating the difference between the prediction direction vector and the prediction direction representative vector (prediction direction differential index), and carry out Huffman encoding, such as arithmetic encoding according to a probability model, for each of the indexes, thereby being able to reduce the code amount.

Next, the processing carried out by the moving image encoding device shown in FIG. 10 will be explained. When receiving the bitstream generated by the moving image encoding device shown in FIG. 1, the variable length decoding part 21 carries out a variable length decoding process on the bitstream to decode a frame size in units of a sequence which consists of one or more frames of pictures or in units of a picture (step ST21 of FIG. 11). After decoding the frame size, the variable length decoding part 21 determines the maximum encoding block size determined by the moving image encoding device shown in FIG. 1 (the maximum size of each of the coding blocks which is a unit to be processed at a time when an intra prediction process or a motion-compensated prediction process is carried out), and the upper limit on the hierarchy number (the number of hierarchical layers in the hierarchy in which each coding block having the maximum size is hierarchically divided into blocks) according to the same procedure as that which the moving image encoding device uses (step ST22).

For example, when the maximum size of each of the coding blocks is determined for all the pictures according to the resolution of the inputted image in the moving image encoding device, the variable length decoding part determines the maximum size of each of the coding blocks on the basis of the frame size which the variable length decoding part has decoded previously according to the same procedure as that which the moving image encoding device shown in FIG. 1 uses. When both the maximum size of each of the coding blocks and the number of hierarchical layers of the coding blocks are multiplexed into the bitstream by the moving image encoding device, the variable length decoding part decodes the bitstream to acquire both the maximum size of each of the coding blocks and the number of hierarchical layers of the coding blocks.

After determining both the maximum size of each of the coding blocks and the number of hierarchical layers of the coding blocks, the variable length decoding part 21 specifies the coded data associated with each coding block from the coded data multiplexed into the bitstream by grasping the state of the hierarchical division of the inputted image into the coding blocks with each coding block having the maximum size being set as a starting point, and decodes the coded data to acquire the coding mode assigned to each of the coding blocks. The variable length decoding part 21 then refers to the division information about the division into partitions $P_i^n$ belonging to the coding block $B^n$ included in the coding mode to specify the coded data associated with each of the partitions $P_i^n$ from the coded data multiplexed into the bitstream (step ST23). The variable length decoding part 21 variable-length-decodes the coded data associated with each of the partitions $P_i^n$ to acquire the compressed data, the prediction difference encoding parameters, and the intra prediction parameter or the inter prediction parameter, and outputs the compressed data and the prediction difference encoding parameters to the inverse quantization/inverse transformation part 25 and also outputs the coding mode and the intra prediction parameter or the inter prediction parameter to the selection switch 22 (step ST24).

For example, when the prediction direction representative index and the prediction direction differential index are multiplexed into the bitstream, the variable length decoding part entropy-decodes the prediction direction representative index and the prediction direction differential index by using, for example, arithmetic decoding methods according to their respective probability models, respectively, to specify the intra prediction parameter from the prediction direction representative index and the prediction direction differential index. As a result, even when the code amount of the intra prediction parameter is reduced in the moving image encoding device, the moving image decoding device can decode the intra prediction parameter correctly.

When the coding mode of each partition $P_i^n$ belonging to the coding block $B^n$ outputted thereto from the variable length decoding part 21 is an intra coding mode, the selection switch 22 outputs the intra prediction parameter outputted thereto from the variable length decoding part 21 to the intra prediction part 23, whereas when the coding mode is an inter coding mode, the selection switch outputs the inter prediction parameter outputted thereto from the variable length decoding part 21 to the motion compensation part 24.

When receiving the intra prediction parameter from the selection switch 22 (step ST25), the intra prediction part 23 carries out an intra prediction process on each partition $P_i^n$ to generate an intra prediction image ($P_i^n$) on the basis of the intra prediction parameter (step ST26), like the intra prediction part 4 shown in FIG. 1. More specifically, the intra prediction part 23 carries out an intra-frame prediction process on each partition $P_i^n$ to generate a prediction image ($P_i^n$) by using already-decoded pixels which are stored in the memory 27 for intra prediction and which are adjacent to the partition $P_i^n$ or already-decoded pixels which are adjacent to a higher layer partition $P_j^{n-1}$ to which the partition $P_i^n$ belongs on the basis of the intra prediction parameter.

When receiving the inter prediction parameter from the selection switch 22 (step ST25), the motion compensation part 24 carries out an inter prediction process on each partition $P_i^n$ to generate an inter prediction image ($P_i^n$) on the basis of the inter prediction parameter, like the motion-compensated prediction part 5 shown in FIG. 1 (step ST27). More specifically, the motion compensation part 24 carries out a motion-compensated prediction process on each partition $P_i^n$ to generate an inter prediction image ($P_i^n$) by using one or more frames of reference images stored in the motion-compensated prediction frame memory 29 on the basis of the inter prediction parameter.

When receiving the prediction difference encoding parameters from the variable length decoding part 21, the inverse quantization/inverse transformation part 25 inverse-quantizes the compressed data associated with the coding block, which are outputted thereto from the variable length decoding part 21, by using the quantization parameter included in the prediction difference encoding parameters, and carries out an inverse transformation process (e.g., an inverse DCT (inverse discrete cosine transform) or an inverse transformation process such as an inverse KL transform) on the compressed data inverse-quantized thereby in units of a block having the transformation block size included in the prediction difference encoding parameters, and outputs the compressed data on which the inverse quantization/inverse transformation part has carried out the inverse transformation process to the adding part 26 as a decoded prediction difference signal (signal showing a pre-compressed difference image) (step ST28).

The adding part 26 generates a decoded image signal showing a decoded partition image or a decoded image which is a group of decoded partition images by adding the decoded prediction difference signal and the prediction signal showing the prediction image ($P_i^n$) generated by the intra prediction part 23 or the motion-compensated prediction part 24, and outputs the decoded image signal to the loop filter part 28 (step ST29). Further, this decoded image is stored in the memory 27 for intra prediction in order that the decoded image can be used for intra prediction.

When receiving the decoded image signal from the adding part 26, the loop filter part 28 compensates for an encoding distortion included in the decoded image signal, and stores the decoded image shown by the decoded image signal on which the loop filter part has carried out the encoding distortion compensation in the motion-compensated prediction frame memory 29 as a reference image and also outputs the decoded image as a reproduced image (step ST30). The loop filter part 28 can carry out the filtering process for each coding block having the maximum size of the decoded image signal inputted thereto or each coding block of the decoded image signal. As an alternative, after the decoded image signals corresponding to all the macroblocks of one screen are inputted, the loop filter part can carry out the filtering process on all the macroblocks of the one screen at a time. The processes of steps ST23 to ST29 are repeatedly carried out until the processing on each partition $P_i^n$ belonging to each of all the coding blocks $B^n$ is completed (step ST31).

As can be seen from the above description, because the intra prediction part 4 of the moving image encoding device in accordance with this Embodiment 1 is constructed in such a way as to, when the coding mode selected by the encoding controlling unit 1 is an intra prediction mode, carryout an intra-frame prediction process using pixels adjacent to a partition $P_i^n$ which is generated through the division by the block dividing unit 2 or pixels adjacent to a higher layer partition $P_j^{n-1}$ to which the partition $P_i^n$ belongs to generate a prediction image ($P_i^n$), there is provided an advantage of being able to increase the degree of improvement in the encoding efficiency with a small amount of computation.

Further, because the intra prediction part 23 of the moving image decoding device in accordance with this Embodiment 1 is constructed in such a way as to, when the coding mode variable-length-decoded by the variable length decoding part 21 is an intra prediction mode, carry out an intra-frame prediction process using already-decoded pixels which are stored in the memory 27 for intra prediction and which are adjacent to a partition $P_i^n$ or already-decoded pixels adjacent to a higher layer partition $P_j^{n-1}$ to which the partition $P_i^n$ belongs to generate a prediction image ($P_i^n$), there is provided an advantage of being able to correctly decode the coded data in which an improvement in the encoding efficiency is provided to acquire the moving image.

Embodiment 2

Although the example in which the variable length encoding part 13 of the moving image encoding device variable-length-encodes the intra prediction parameter for a partition to be encoded is shown in above-mentioned Embodiment 1, the variable length encoding part can variable-length-encode an intra merge flag indicating whether or not the intra prediction parameter for the partition to be encoded is identical to that for a partition adjacent to the partition, and can also variable-length-encode an intra merge direction for specifying the adjacent partition when the intra prediction parameter for the partition to be encoded is identical to that for the adjacent partition, otherwise variable-length-encode the intra prediction parameter for the partition to be encoded.

Further, although the example in which the variable length decoding part 21 of the moving image decoding device variable-length-decodes the coded data associated with a partition to be decoded to acquire the intra prediction parameter for the partition is shown in above-mentioned Embodiment 1, the variable length decoding part can variable-length-decode the coded data associated with the partition to be decoded to acquire the intra merge flag indicating whether or not the intra prediction parameter for the partition to be decoded is identical to that for a partition adjacent to the partition, and can also variable-length-decode the coded data to acquire the intra merge direction for specifying the adjacent partition when the intra prediction parameter for the partition to be decoded is identical to that for the adjacent partition, otherwise variable-length-decode the coded data to acquire the intra prediction parameter for the partition to be encoded.

Because a moving image encoding device and a moving image decoding device in accordance with this embodiment have the same structures as those according to above-mentioned Embodiment 1 except for components corresponding to encoding and decoding of an intra prediction parameter, only the encoding and decoding of the intra prediction parameter will be explained in this Embodiment 2.

Figure 12:
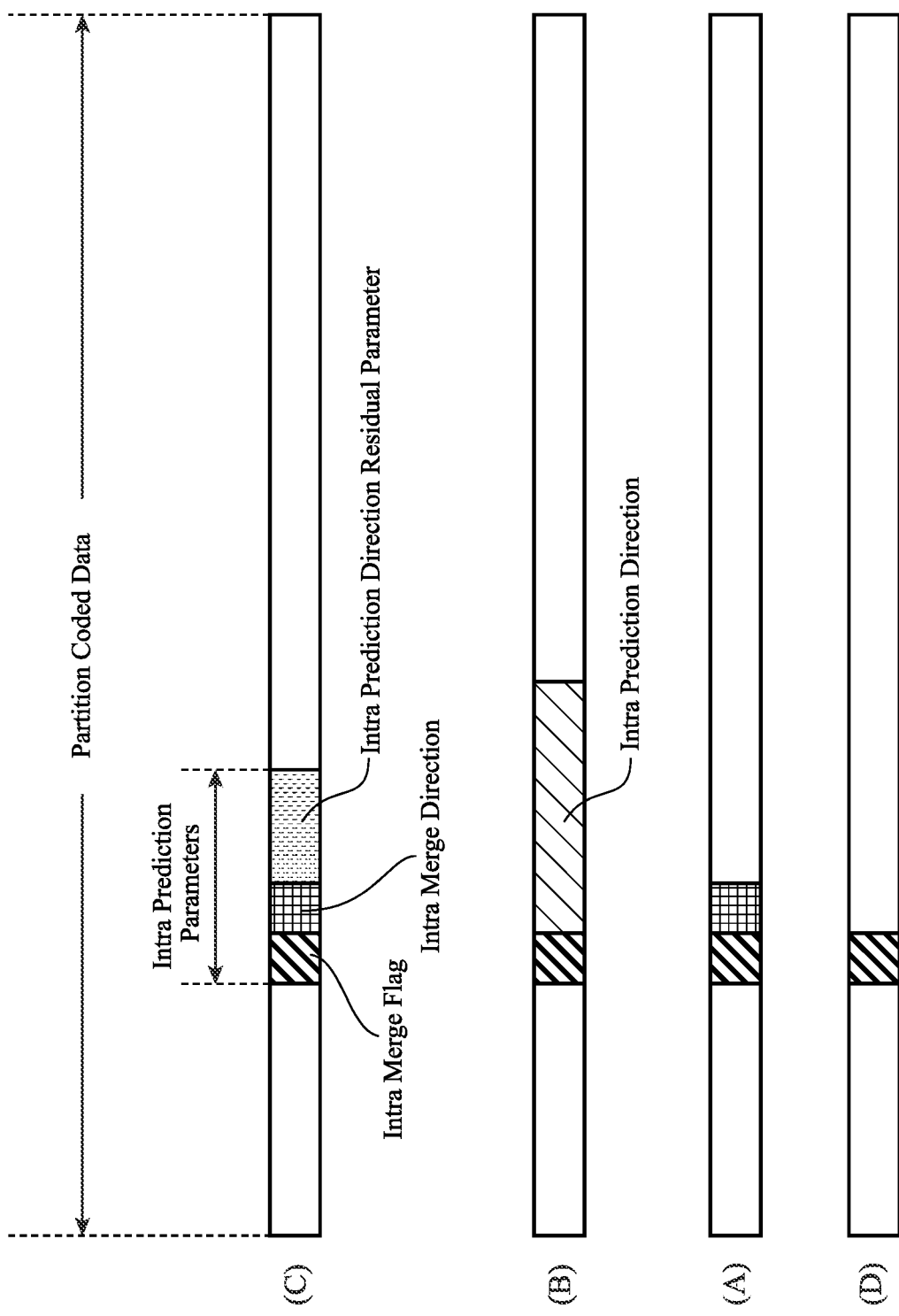
FIG. 12 is an explanatory drawing showing coded data of each partition.
Figure 14:
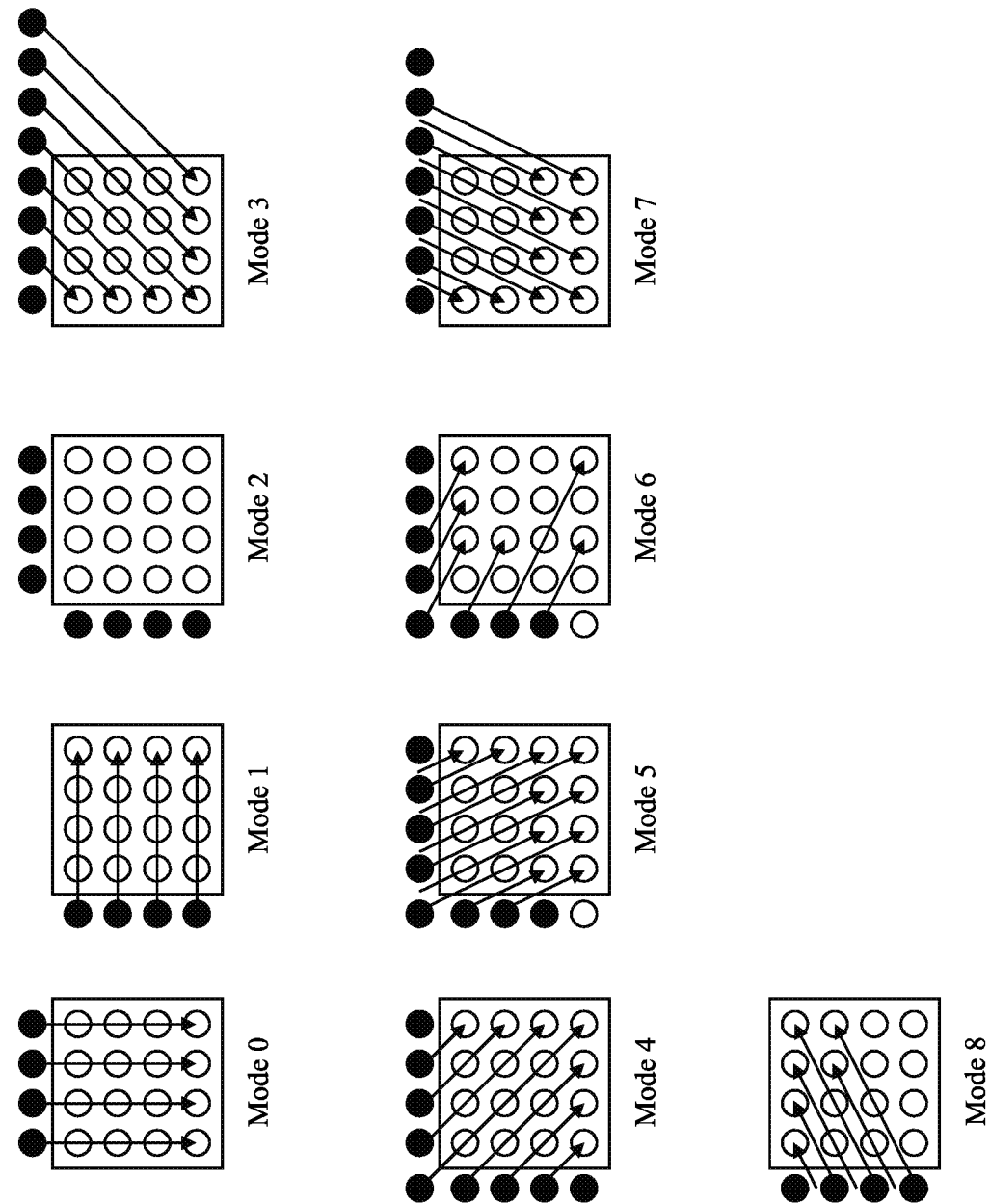
FIG. 14 is an explanatory drawing showing intra prediction modes in the case of a 4×4 pixel block size for luminance.

When variable-length-encoding the intra prediction parameter for a partition $P_i^n$ to be encoded (target to be processed), a variable length encoding part 13 of the moving image encoding device in accordance with this Embodiment 2 variable-length-encodes an intra merge flag indicating whether the intra prediction parameter is identical to that for a partition adjacent to the partition $P_i^n$, as shown in FIG. 12(A). When the intra merge flag indicates that the intra prediction parameter is identical to that for an adjacent partition, the variable length encoding part 13 also variable-length-encodes an intra merge direction showing which one of adjacent partitions has the same intra prediction parameter as the partition to be encoded. In contrast, when the intra merge flag indicates that the intra prediction parameter is not identical to that for any adjacent partition, the variable length encoding part variable-length-encodes the intra prediction parameter for the partition $P_i^n$ to be encoded (in this case, the variable length encoding part carries out the same encoding as that shown in above-mentioned Embodiment 1), as shown in FIG. 12(B).

For example, when a partition adjacent to the left of the partition to be encoded and a partition adjacent to the top of the partition to be encoded are listed as adjacent partition candidates, as shown in FIG. 13(A), a flag indicating whether the intra prediction parameter for the partition to be encoded is identical to that for the partition adjacent to the left of the partition to be encoded or those for the partition adjacent to the top of the partition to be encoded is provided as the intra merge direction. As an alternative, a partition adjacent to the left of the partition to be encoded, a partition adjacent to the top left of the partition to be encoded, and a partition adjacent to the top of the partition to be encoded are listed can be listed as adjacent partition candidates, and a flag indicating which one of the three candidates has the same intra prediction parameter as the partition to be encoded can be provided as the intra merge direction, as shown in FIG. 13(B). In a case in which all adjacent partitions each of which can be the target for flag encoding have the same intra prediction parameter, it is not necessary to encode the intra merge direction as a matter of course. Therefore, the variable length encoding part can be constructed in such a way as not to encode the intra merge direction in this case, as shown in FIG. 12(D). Further, the variable length encoding part can be constructed in such a way as to, when there are two or more partitions adjacent to the top or left of the partition to be encoded, scan the partitions in a direction away from a top left side of the partition to be encoded, for example, and select the first partition which has been encoded in an intra prediction mode as the adjacent partition to the top or left of the partition to be encoded.

Further, when the number NumN of selectable intra prediction directions in the adjacent partition is not equal to the number NumC of selectable intra prediction directions in the partition to be encoded, the variable length encoding part can be constructed in the following way. More specifically, when NumN<NumC, the variable length encoding part brings a representative prediction direction vector, among the prediction direction vectors of a plurality of directional predictions in the partition $P_i^n$ to be encoded, into correspondence with one of the selectable intra prediction directions in the adjacent partition to determine whether the intra prediction parameter for the partition $P_i^n$ to be encoded matches that for the adjacent partition. In this case, when determining that the intra prediction parameter for the partition $P_i^n$ to be encoded match those for the adjacent partition, the variable length encoding part encodes an intra prediction direction residual parameter showing which one of the plurality of corresponding intra prediction directions has been selected for the partition $P_i^n$ to be encoded, as shown in FIG. 12(C).

In contrast, when NumN>NumC, the variable length encoding part brings a representative prediction direction vector, among the prediction direction vectors of a plurality of directional predictions in the adjacent partition, into correspondence with one of the selectable intra prediction directions in the partition $P_i^n$ to be encoded to determine whether the intra prediction parameter for the partition $P_i^n$ to be encoded matches that for the adjacent partition. In this case, the variable length encoding part does not have to encode the intra prediction direction residual parameter. Because it can be considered that an intra prediction mode has a direction depending on the texture of the image to be encoded, a similar prediction mode easily occurs locally. Therefore, the variable length encoding part can encode the intra prediction parameter with a smaller amount of information by encoding the intra prediction parameter by using the intra merge flag and the intra merge direction.

When variable-length-decoding the intra prediction parameter in a partition $P_i^n$ to be decoded (target to be processed), a variable length decoding part 21 of the moving image decoding device in accordance with this Embodiment 2 variable-length-decodes the intra merge flag indicating whether or not the intra prediction parameter is identical to that for a partition adjacent to the partition $P_i^n$, as shown in FIG. 12(A). Further, when the intra merge flag indicates that the intra prediction parameter is identical to that for an adjacent partition, the variable length decoding part 21 variable-length-decodes the intra merge direction showing which one of adjacent partitions has the same intra prediction parameter as the partition to be decoded. In contrast, when the intra merge flag indicates that the intra prediction parameter is not identical to that for an adjacent partition, the variable length decoding part variable-length-decodes the intra prediction parameter in the partition $P_i^n$ to be decoded (in this case, the variable length decoding part carries out the same decoding as that shown in above-mentioned Embodiment 1), as shown in FIG. 12(B).

For example, when a partition adjacent to the left of the partition to be decoded and a partition adjacent to the top of the partition to be decoded are listed as adjacent partition candidates, as shown in FIG. 13(A), a flag indicating whether the intra prediction parameter for the partition to be decoded is identical to that for the partition adjacent to the left of the partition to be decoded or those for the partition adjacent to the top of the partition to be decoded is provided as the intra merge direction. As an alternative, a partition adjacent to the left of the partition to be decoded, a partition adjacent to the top left of the partition to be decoded, and a partition adjacent to the top of the partition to be decoded can be listed as adjacent partition candidates, and a flag indicating which one of the three candidates has the same intra prediction parameter as the partition to be decoded can be provided as the intra merge direction, as shown in FIG. 13(B). In a case in which all adjacent partitions each of which can be the target for flag encoding have the same intra prediction parameter, it is not necessary to encode the intra merge direction as a matter of course. Therefore, the variable length decoding part can be constructed in such a way as not to decode the intra merge direction in this case, as shown in FIG. 12(D). Further, the variable length decoding part can be constructed in such a way as to, when there are two or more partitions adjacent to the top or left of the partition to be decoded, scan the partitions in a direction away from a top left side of the partition to be decoded, for example, and select the first partition which has been encoded in an intra prediction mode as the adjacent partition to the top or left of the partition to be decoded.

Further, when the number NumN of selectable intra prediction directions in the adjacent partition is not equal to the number NumC of selectable intra prediction directions in the partition to be decoded, the variable length decoding part can be constructed in the following way. More specifically, when NumN<NumC, the variable length decoding part brings a representative prediction direction vector, among the prediction direction vectors of a plurality of directional predictions in the partition $P_i^n$ to be decoded, into correspondence with one of the selectable intra prediction directions in the adjacent partition to determine whether the intra prediction parameter for the partition $P_i^n$ to be decoded matches that for the adjacent partition. In this case, when determining that the intra prediction parameter for the partition $P_i^n$ to be decoded matches that for the adjacent partition, the variable length decoding part encodes an intra prediction direction residual parameter showing which one of the plurality of corresponding intra prediction directions has been selected for the partition $P_i^n$ to be decoded, as shown in FIG. 12(C).

In contrast, when NumN>NumC, the variable length decoding part brings a representative prediction direction vector, among the prediction direction vectors of a plurality of directional predictions in the adjacent partition, into correspondence with one of the selectable intra prediction directions in the partition $P_i^n$ to be decoded to determine whether the intra prediction parameter for the partition $P_i^n$ to be decoded matches that for the adjacent partition. In this case, the variable length decoding part does not have to decode the intra prediction direction residual parameter. Because the variable length decoding part is constructed in this way, the variable length decoding part can properly decode the intra prediction parameter which is encoded by the moving image encoding device in accordance with this Embodiment 2. As a matter of course, the variable length encoding unit and the variable length decoding unit in accordance with this Embodiment 2 can also be applied to a case in which the partition to be processed and the adjacent partition are not placed in a prediction mode, as explained in this Embodiment 1, in which part of an intra prediction image in a higher hierarchical layer is extracted.

While the invention has been described in its preferred embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

As mentioned above, because the image coding device, the image decoding device, the image coding method, and the image decoding method in accordance with the present invention are capable of increasing the degree of improvement in the encoding efficiency which is caused by an increase in the number of directional predictions with a small amount of computation and a small code amount, the image coding device and the image coding method are suitable for use as an image coding device for and an image coding method of encoding a moving image with a high degree of efficiency, and so on, and the image decoding device and the image decoding method are suitable for use as an image decoding device for and an image decoding method of decoding an encoded moving image with a high degree of efficiency, and so on.

1 encoding controlling part (encoding controlling unit), 2 block dividing part (block dividing unit), 3 select switch (prediction image generating unit), 4 intra prediction part (prediction image generating unit), 5 motion-compensated prediction part (prediction image generating unit), 6 subtracting part (difference image generating unit), 7 transformation/quantization part (image compression unit), 8 inverse quantization/inverse transformation part, 9 adding part, memory for intra prediction, 11 loop filter part, 12 motion-compensated prediction frame memory, 13 variable length encoding part (variable length encoding unit), 21 variable length decoding part (variable length decoding unit), 22 select switch (prediction image generating unit), 23 intra prediction part (prediction image generating unit), 24 motion compensation part (prediction image generating unit), 25 inverse quantization/inverse transformation part (difference image generating unit), 26 adding part (decoded image generating unit), 27 memory for intra prediction, 28 loop filter part, 29 motion-compensated prediction frame memory.

The invention claimed is:
1. An image decoding device comprising:
a variable length decoder for performing a variable-length-decoding process on a coded data multiplexed into a bitstream to obtain a coding mode and a compressed data for each of coding blocks divided up to an upper limit on a number of hierarchical layers; and
a loop filter for performing a loop filtering process on a decoded image signal which is obtaining by adding an intra prediction image or an inter prediction image to a decoded prediction difference signal;

wherein said variable length decoder obtains from said bitstream an intra merge flag indicating whether or not an intra prediction parameter of said current partition is identical to that of an adjacent partition located above or to the left of said current partition, wherein when there are two or more partitions adjacent to top or left of said current partition, a first partition in a direction away from a top left of said current partition is selected as said adjacent partition, wherein when said intra merge flag indicates that said intra prediction parameter of said current partition is identical to that of said adjacent partition, said variable length decoder obtains from said bitstream an intra merge direction specifying, out of said adjacent partitions located above and to the left of said current partition, the adjacent partition whose intra prediction parameter is identical to that of said current partition, and when said intra prediction parameter of said current partition is not identical to that of said adjacent partition, said variable length decoder obtains from said bitstream said intra prediction parameter for said current partition.

2. An image decoding method comprising:

performing a variable-length-decoding process on a coded data multiplexed into a bitstream to obtain a coding mode and a compressed data for each of coding blocks divided up to an upper limit on a number of hierarchical layers;

performing a loop filtering process on a decoded image signal which is obtaining by adding an intra prediction image or an inter prediction image to a decoded prediction difference signal;

obtaining from said bitstream an intra merge flag indicating whether or not an intra prediction parameter of said current partition is identical to that of an adjacent partition located above or to the left of said current partition;

when there are two or more partitions adjacent to top or left of said current partition, selecting a first partition in a direction away from a top left of said current partition as said adjacent partition;

when said intra merge flag indicates that said intra prediction parameter of said current partition is identical to that of said adjacent partition, obtaining from said bitstream an intra merge direction specifying, out of said adjacent partitions located above and to the left of said current partition, the adjacent partition whose intra prediction parameter is identical to that of said current partition; and when said intra prediction parameter of said current partition is not identical to that of said adjacent partition, obtaining from said bitstream said intra prediction parameter for said current partition.

3. An image coding device comprising:

an encoding control unit for identifying a coding mode of each of coding blocks which is obtained by hierarchically dividing a coding block having a maximum size which is a unit for a coding process a loop filter for performing a loop filtering process on a decoded image signal which is obtaining by adding an intra prediction image or an inter prediction image to a decoded prediction difference signal; and a variable length coding unit for performing a variable length coding on the coding mode, and compressed data obtained from a difference between an original image and the intra prediction image or the inter prediction image, of each of the hierarchically divided coding blocks, said variable length coding unit multiplexing a coded data of said coding mode and said compressed data to a bitstream;

said variable length coding unit performing a variable length coding on an intra merge flag indicating whether or not said intra prediction parameter of said current partition is identical to an intra prediction parameter of an adjacent partition located above or to the left of said intra predicted partition, and multiplexing said intra merge flag into said bitstream;

wherein when there are two or more partitions adjacent to top or left of said current partition, a first partition in a direction away from a top left of said current partition is selected as said adjacent partition, wherein when said intra prediction parameter of said current partition is identical to that of said adjacent partition, said variable length coding unit performs a variable length coding on an intra merge direction specifying, out of adjacent partitions located above and to the left of said current partition, the adjacent partition whose intra prediction parameter is identical to that of said current partition, and said intra merge direction is multiplexed into said bitstream, and when said intra prediction parameter of said current partition is not identical to that of said adjacent partition, said variable length coding unit performs a variable length coding on said intra prediction parameter of said current partition, and said intra prediction parameter is multiplexed into said bitstream.

4. An image coding method comprising:

identifying a coding mode of each of coding blocks which is obtained by hierarchically dividing a coding block having a maximum size which is a unit for a coding process;

performing a loop filtering process on a decoded image signal which is obtaining by adding an intra prediction image or an inter prediction image to a decoded prediction difference signal;

performing a variable length coding on the coding mode, and compressed data obtained from a difference between an original image and the intra prediction image or the inter prediction image, of each of the hierarchically divided coding blocks and multiplexing a coded data of said coding mode and said compressed data to a bitstream;

performing a variable length coding on an intra merge flag indicating whether or not said intra prediction parameter of said current partition is identical to an intra prediction parameter of an adjacent partition located above or to the left of said intra predicted partition, and multiplexing said intra merge flag into said bitstream;

when there are two or more partitions adjacent to top or left of said current partition, selecting a first partition in a direction away from a top left of said current partition as said adjacent partition;

when said intra prediction parameter of said current partition is identical to that of said adjacent partition, performing a variable length coding on an intra merge direction specifying, out of adjacent partitions located above and to the left of said current partition, the adjacent partition whose intra prediction parameter is identical to that of said current partition, and said intra merge direction is multiplexed into said bitstream; and when said intra prediction parameter of said current partition is not identical to that of said adjacent partition, performing a variable length coding on said intra prediction parameter of said current partition, and said intra prediction parameter is multiplexed into said bitstream.

5. A non-transitory computer-readable medium storing a bit stream having computer-executable coded data specifying a coding mode of a hierarchically divided coding block, said coded data comprising:
- an intra merge flag indicating whether or not an intra prediction parameter of a current partition is identical to that of an adjacent partition located above or to the left of said current partition;
- an intra merge direction for said current partition of which said intra prediction parameter is identical to that of said adjacent partition, said intra merge direction specifying, out of adjacent partitions located above and to the left of said current partition, the adjacent partition whose intra prediction parameter is identical to that of said current partition; and
- said intra prediction parameter for said current partition of which said intra prediction parameter is not identical to that of said adjacent partition;
- compressed data obtained from a difference between an original image and a prediction image obtained by a prediction process which the coding mode shows; and
- wherein when there are two or more partitions adjacent to top or left of said current partition, a first partition in a direction away from a top left of said current partition is selected as said adjacent partition.

* * * * *